(12) United States Patent
Menze et al.

(10) Patent No.: US 7,137,724 B2
(45) Date of Patent: Nov. 21, 2006

(54) INDEPENDENT LIGHTING SYSTEM AND METHOD

(75) Inventors: William F. Menze, Escanaba, MI (US); Timothy G. Koch, Slinger, WI (US)

(73) Assignee: Sno-Way International, Inc., Hartford, WI (US)

( * ) Notice: Subject to any disclaimer, the term of this patent is extended or adjusted under 35 U.S.C. 154(b) by 181 days.

(21) Appl. No.: 11/047,303

(22) Filed: Jan. 31, 2005

(65) Prior Publication Data

US 2006/0171163 A1    Aug. 3, 2006

(51) Int. Cl.
*B60Q 1/04* (2006.01)
(52) U.S. Cl. .................. 362/543; 307/10.1; 315/82; 439/36
(58) Field of Classification Search ............... 362/507, 362/543, 549; 307/10.1; 315/82; 439/36
See application file for complete search history.

(56) References Cited

U.S. PATENT DOCUMENTS

| 4,280,062 A | * | 7/1981 | Miller et al. ............... 315/82 |
| 5,420,480 A | * | 5/1995 | Knepel et al. .............. 315/82 |
| 5,951,144 A | | 9/1999 | Gavigan et al. |
| 5,997,320 A | | 12/1999 | DeMello |
| 6,005,300 A | | 12/1999 | Kelly |
| 6,153,975 A | | 11/2000 | Perdec |
| 6,154,122 A | | 11/2000 | Menze |
| 6,265,829 B1 | | 7/2001 | Perdec |
| 6,273,729 B1 | | 8/2001 | Kelly |
| 6,323,759 B1 | | 11/2001 | Menze |
| 6,640,468 B1 | | 11/2003 | Menze |
| 6,790,092 B1 | | 9/2004 | Parsadayan et al. |
| 2002/0171291 A1 | | 11/2002 | Wayne et al. |

* cited by examiner

*Primary Examiner*—Stephen F Husar
(74) *Attorney, Agent, or Firm*—Reinhart Boerner Van Deuren s.c.

(57) ABSTRACT

An auxiliary lighting systems for use with snow plows and like front-mounted vehicle accessories is disclosed which facilitates the interconnection of such auxiliary lighting systems to the lighting system of a vehicle upon which the vehicle accessory is mounted to provide power to and to control the auxiliary lights with the lighting system of the vehicle. The independent lighting system provides first and second harness portions for respective installation on the vehicle and the vehicle accessory, with the first harness portion having a first configuration when it is not connected to the second harness portion and a second configuration when it is connected to the second harness portion. The first configuration allow the headlights on the vehicle top operate, while the second configuration allows only the headlights on the vehicle accessory to operate, with changes between the first and second configurations being accomplished without the need for a switch or a relay.

20 Claims, 12 Drawing Sheets

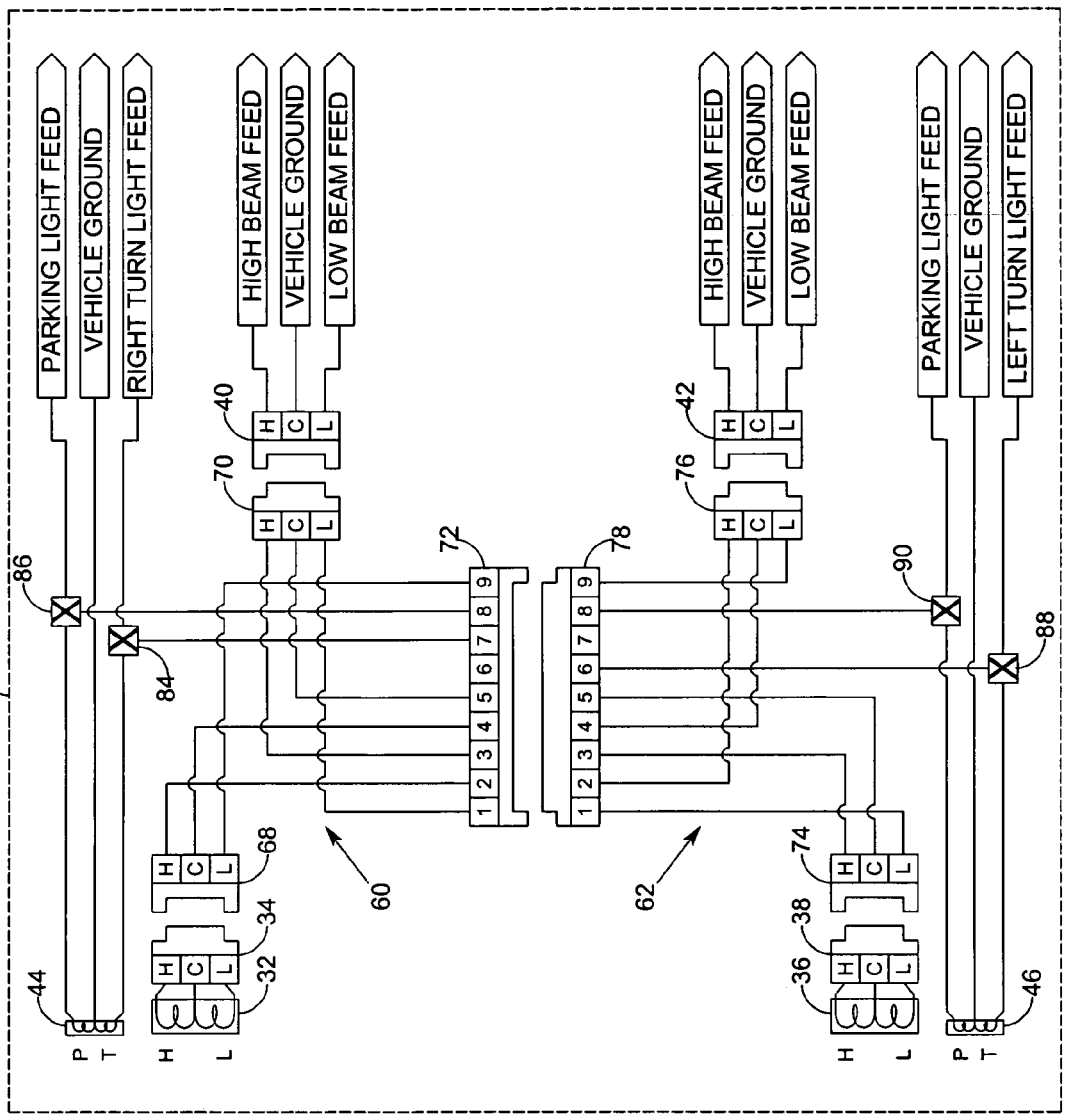
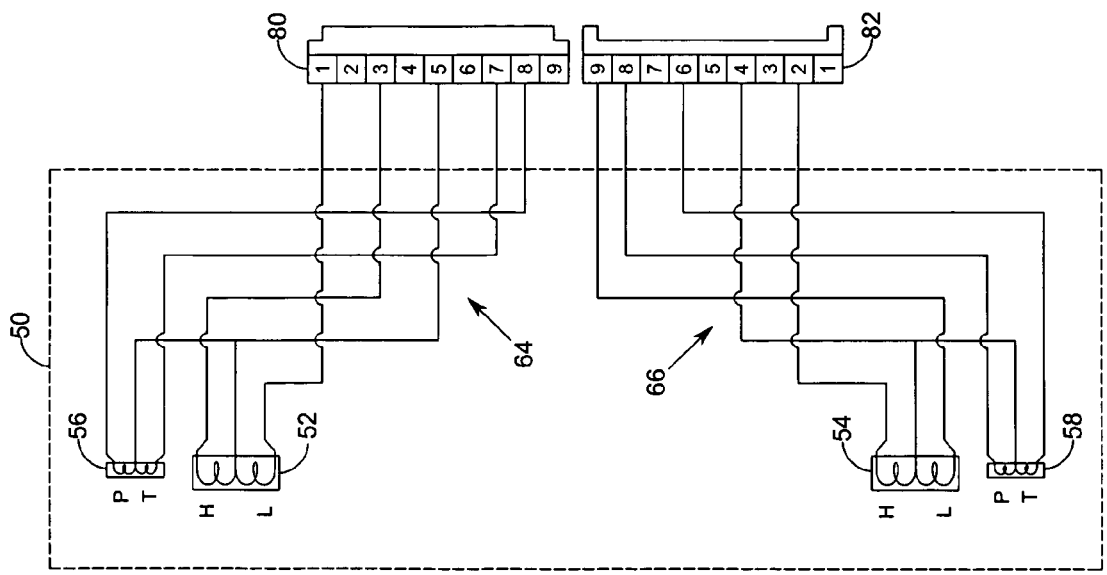
Fig. 3

INDEPENDENT LIGHTING SYSTEM AND METHOD

BACKGROUND OF THE INVENTION

Field of the Invention

The present invention relates generally to auxiliary lighting systems such as those found on snow plows and like front-mounted vehicle accessories, and more particularly to a wiring harness for facilitating the interconnection of such auxiliary lighting systems to the lighting system of a vehicle upon which the vehicle accessory is mounted to provide power to and to control the auxiliary lights with the lighting system of the vehicle.

Snow plows and like front-mounted vehicle accessories are mounted on vehicles such as pickup trucks or sport utility vehicles (SUV's) have been in use for some time, and such snow plows allow the quick and convenient plowing and removal of snow using the vehicle. Such snow plows and like front-mounted vehicle accessories are removable from the vehicle so that they need be attached to the vehicle only when needed (for snow plows, during the winter season when they will be used, with snow plows typically being removed from the vehicle for the balance of the year). Since such front-mounted vehicle accessories are mounted at the front of the vehicle in a position and at a level in front of the front end of the vehicle, they obstruct the lights of the vehicle, thereby necessitating the inclusion of lights on the vehicle accessory (for snow plows, in a position above the blade of the snow plow). It is particularly important to include headlights on such vehicle accessories which may be used at night (snow plows are frequently used in the early morning hours following a snow storm, well prior to sunrise).

Such front-mounted vehicle accessories typically have auxiliary headlights which are mounted on lighting bars located on the frames of the vehicle accessories. Since front-mounted vehicle accessories are mounted on vehicles in positions which obstruct the headlights of the vehicles, the headlights of vehicles having such vehicle accessories mounted thereon are typically disconnected. This is done for two reasons, the first of which is that since the headlights of a vehicle having a front-mounted vehicle accessory are obstructed by the vehicle accessory, and thus the headlights of the vehicle do not provide useful light and are redundant in view of the headlights mounted on the vehicle accessory. The second reason is that the simultaneous use of both headlights on a vehicle and headlights on a front-mounted vehicle accessory will require a high current drain which will have a number of adverse effect on the vehicle ranging from blowing the fuses on the headlights circuit to potentially and rapidly draining the battery and disabling the vehicle.

For this reason, lighting systems on front-mounted vehicle accessories are designed to allow the headlights of the vehicle to be disconnected and instead to operate the headlights of the vehicle accessory from the lighting system of the vehicle. Early examples of such lighting systems for use with snow plows are shown in U.S. Pat. No. 4,280,062, to Miller et al., and in U.S. Pat. No. 5,420,480, to Knepel et al., both of which are hereby incorporated herein by reference. The Miller et al. reference shows an auxiliary light wiring harness which plugs into the lighting system of the vehicle and provides a switch which allows an operator of the vehicle to select either the vehicle headlights or the snow plow headlights. This system of course has the substantial disadvantage of running extended lengths of wiring through which the electrical current operating the headlights must travel, potentially resulting in losses and diminished brightness from the headlights.

The Knepel et al. shows an automatic headlight switching system which utilizes relays to perform the function of switching between the vehicle headlights or the snow plow headlights. A connector is provided to connect the portion of the wiring harness of the headlight switching system in the vehicle to the portion of the wiring harness on the snow plow. The headlight system detects when the lighting harness of the snow plow is plugged into the wiring harness of the vehicle and actuates the relays to connect the headlights on the snow plow and to disconnect the headlights on the vehicle.

More recently, there have been several additional systems which may be used to interconnect the lighting system of a vehicle with the wiring system of a front-mounted vehicle accessory such as a snow plow. Examples of such systems are shown in U.S. Pat. No. 6,005,300, to Kelly, in U.S. Pat. No. 6,265,829, to Perdec, and in U.S. Pat. No. 6,396,210, to Menze, all of which are hereby incorporated herein by reference. The Kelly reference uses a lighting switch connected to an independent circuit to operate a control module which switches power between the vehicle headlights and the auxiliary headlights. The Perdec reference uses a microprocessor module which may be wirelessly controlled to control the operation of and switching between the vehicle headlights and the auxiliary headlights. The Menze reference discloses a headlight adapter system which uses modular wiring harnesses and connectors with a headlight selector switch to switch power between the vehicle headlights and auxiliary snow plow headlights.

All of these references have one thing in common in that each of them require a switching mechanism of some sort to switch between operation of the vehicle headlights and operation of the auxiliary headlights. The reason for the requirement of a switch is simple—each of these references adds a wiring harness which is permanently installed in the vehicle, and which plugs into a wiring harness located on the front-mounted vehicle accessory. Since it is a requirement that the vehicle headlights and the auxiliary headlights not be operated simultaneously, at least not with both at full intensity, in order to prevent excessive current drain, these previously known systems each require the use of a switch to select either the vehicle headlights or the auxiliary headlights.

It is accordingly the primary objective of the present invention that it provide an independent lighting system for facilitating the operation of auxiliary headlights which automatically disconnects the vehicle headlights whenever the auxiliary headlights are connected for operation with the lighting system of the vehicle. It is a related objective of the present invention that it completely eliminate the need for any type of switch to choose between the vehicle headlights and the auxiliary headlights, relying instead upon a design that will automatically disconnect the vehicle headlights and automatically connect the auxiliary headlights when the wiring harness of the front-mounted vehicle accessory is connected to the wiring harness of the vehicle. It is another related objective of the present invention that it eliminate the need for any relays or additional electronic components to perform a switching function between the vehicle headlights and the auxiliary headlights.

It is a further objective of the present invention that it feature a simplified design which does not require any wiring or other connection to the passenger compartment of the vehicle in which it is to be installed. It is a related objective of the present invention that it be relatively simple and quick to install, and that it does not require either advanced knowledge of vehicle electrical systems or special tools in order to accomplish its installation. It is yet another objective of the present invention that it provide sealed connectors to protect against the elements to which it will be exposed in operation. It is a related objective of the present invention that it not rely upon the need for connector caps to protect its connectors, but rather that it eliminate the need for such caps, thereby precluding the possibility of such caps being lost or misplaced.

The independent lighting system of the present invention must also be of construction which is both durable and long lasting, and it should also require little or no maintenance to be provided by the user throughout its operating lifetime. In order to enhance the market appeal of the independent lighting system of the present invention, it should also be of inexpensive construction to thereby afford it the broadest possible market. Finally, it is also an objective that all of the aforesaid advantages and objectives of the independent lighting system of the present invention be achieved without incurring any substantial relative disadvantage.

SUMMARY OF THE INVENTION

The disadvantages and limitations of the background art discussed above are overcome by the present invention. With this invention, an independent lighting system consists of a first wiring harness portion that is connected to the lights of a conventional vehicle lighting system located at the front of the vehicle, and a second wiring harness portion that is connected to auxiliary lights mounted on a vehicle accessory such as a snow plow. The lights which are respectively connected to the two wiring harnesses include, at a minimum, the headlights of the vehicle and auxiliary headlights on the vehicle accessory.

The headlights of vehicles typically utilize modular connectors, with each of the headlights having prongs extending from the back side thereof and the vehicle wiring harness having headlight plugs which are plugged onto the prongs extending from the back side of the headlights. The first harness portion of the independent lighting system of the present invention includes connectors which fit between the headlight plugs and the prongs extending from the back side of the headlights. A headlight connector is plugged onto the prongs extending from the back side of each of the headlights, replacing the headlight plugs. A headlight power connector is plugged into each of the headlight plugs, which were plugged onto the prongs extending from the back side of the headlights prior to installation of the independent lighting system of the present invention.

In the preferred embodiment, the first harness portion of the independent lighting system of the present invention that is located in the vehicle includes right and left halves (the right half of the first harness portion is for connection to the headlight on the right side of the vehicle, and the left half of the first harness portion is for connection to the headlight on the left side of the vehicle). Each half of the first harness portion has a harness connector as well as a headlight connector and a headlight power connector. The harness connectors on the right and left halves of the first harness portion are mating connectors, with one of the harness connectors being a male harness connector and the other of the harness connectors being a female harness connector. Prior to installation, the male and female harness connectors on the left and right halves of the first harness portion of the independent lighting system of the present invention are connected together, and the headlights of the vehicle operate in their normal fashion. It should be noted that if the male and female harness connectors on the left and right halves of the first harness portion are not connected together, the headlights of the vehicle will not operate.

The second harness portion of the independent lighting system of the present invention is connected to headlights mounted on the vehicle accessory, and in the preferred embodiment the second harness portion also includes right and left halves. The right half of the second harness portion is connected to a headlight on the right side of the vehicle accessory, and the left half of the second harness portion is connected to a headlight on the left side of the vehicle accessory. Each half of the second harness portion has a harness connector, with the harness connectors on the right and left halves of the second harness portion being mating connectors, with one of the harness connectors being a male harness connector and the other of the harness connectors being a female harness connector.

When the vehicle accessory is mounted on the vehicle, the harness connectors on the first harness portion in the vehicle are disconnected from each other, and are respectively connected to the harness connectors on the second harness portion on the vehicle accessory. In the preferred embodiment, the harness connector on the right side of the second harness portion on the vehicle accessory will be connected to the harness connector on the right side of the first harness portion in the vehicle, and the harness connector on the left side of the second harness portion on the vehicle accessory will be connected to the harness connector on the left side of the first harness portion in the vehicle. Since the harness connectors are male and female mating connectors, it will be appreciated by those skilled in the art that the proper interconnections of the two harness portions will be ensured. It will also be appreciated by those skilled in the art than one of the harness connectors in the second harness portion on the vehicle accessory is male, while the other harness connector in the second harness portion is female.

When the first harness portion in the vehicle is so connected to the second harness portion on the vehicle accessory, the headlights on the vehicle accessory will be operated by the headlight controls of the vehicle, and the headlights of the vehicle are disconnected and will not operate. This includes both high beams and low beams of the headlights. When the vehicle accessory is to be disconnected and removed from the vehicle, the first harness portion is disconnected from the second harness portion, with the harness connectors in the first harness portion in the vehicle being connected together to reconnect the headlights in the vehicle. In addition, the harness connectors in the second harness portion on the vehicle accessory may be connected together to protect them from corrosion. In the preferred embodiment, the harness connectors in both of the first and second harness portions are of weatherproof design and have a sealing construction to protect them from the elements and corrosion.

In the preferred embodiment of the independent lighting system of the present invention, the first and second harness portions also include wiring and connections to operate parking lights and turn signals on the vehicle accessory when it is installed on the vehicle. Since parking lights and turn signals draw considerably less current than headlights, the parking lights and the turn signals on the vehicle accessory will, in the preferred embodiment, operate simultaneously with, rather than instead of, the parking lights and the turn signals on the vehicle. Thus, the parking lights and the turn signals on the vehicle will operate irrespective of whether or not the harness connectors of the first harness portion are connected together, connected to harness connectors in the second harness portion, or completely disconnected.

There are at least three different versions of the preferred embodiment of the independent lighting system of the present invention as described herein, with the different versions being characterized by which of the electrical connections are made by the harness connectors. In a first preferred embodiment, both the electrically hot connections to the headlights and the neutral or ground connections to the headlights are interrupted by the first and second harness portions. In a second preferred embodiment, only the electrically hot connections to the headlights are interrupted by the first and second harness portions. In a third preferred embodiment, only the neutral or ground connections to the headlights are interrupted by the first and second harness portions.

An alternate embodiment of the independent lighting system of the present invention is also contemplated, and will be briefly described herein. In the alternate embodiment, only a single harness connector is used on each of the first and second harness portions. In this embodiment, when the harness connectors on the first and second harness portions are connected together, the headlights on the vehicle accessory will operate and the headlights on the vehicle are disconnected and will not operate. When the vehicle accessory is removed and disconnected from the vehicle, a jumper harness connector is installed onto the harness connector on the first harness portion in the vehicle to enable the operation of the headlights in the vehicle. In this embodiment, a cap may be placed on the harness connector of the second harness portion on the vehicle accessory to protect it from the elements and corrosion.

It may therefore be seen that the present invention teaches an independent lighting system which facilitates the operation of auxiliary headlights by automatically disconnecting the vehicle headlights whenever the auxiliary headlights are connected for operation with the lighting system of the vehicle. The independent lighting system of the present invention completely eliminates the need for any type of switch to choose between the vehicle headlights and the auxiliary headlights due to its design that allows the mere connection of the wiring harness of the front-mounted vehicle accessory to the wiring harness of the vehicle to disconnect the vehicle headlights and to connect the auxiliary. The independent lighting system of the present invention also eliminates the need for any relays or additional electronic components to perform a switching function between the vehicle headlights and the auxiliary headlights.

The independent lighting system of the present invention features a simplified design which does not require any wiring or other connection to the passenger compartment of the vehicle in which it is installed. The independent lighting system of the present invention is relatively simple and quick to install, and that it requires neither advanced knowledge of vehicle electrical systems nor special tools in order to accomplish its installation. The independent lighting system of the present invention provides sealed connectors to protect against the elements to which it will be exposed in operation, and does not rely upon the need for connector caps to protect its connectors, but rather eliminates the need for such caps entirely, thereby precluding the possibility of their loss or misplacement.

The independent lighting system of the present invention is of a construction which is both durable and long lasting, and will require little or no maintenance to be provided by the user throughout its operating lifetime. The independent lighting system of the present invention is also of inexpensive construction to enhance its market appeal and to thereby afford it the broadest possible market. Finally, all of the aforesaid advantages and objectives of the independent lighting system of the present invention are achieved without incurring any substantial relative disadvantage.

DESCRIPTION OF THE DRAWINGS

These and other advantages of the present invention are best understood with reference to the drawings, in which:

FIG. 3 is a schematic depiction of a first embodiment of an independent lighting system which is constructed according to the teachings of the present invention to connect and operate the auxiliary lights located on a vehicle accessory shown in FIG. 2 to the vehicle lighting system shown in FIG. 1, with the auxiliary lights not connected to the vehicle lighting system;

DETAILED DESCRIPTION OF THE PREFERRED EMBODIMENT

Figure 1:
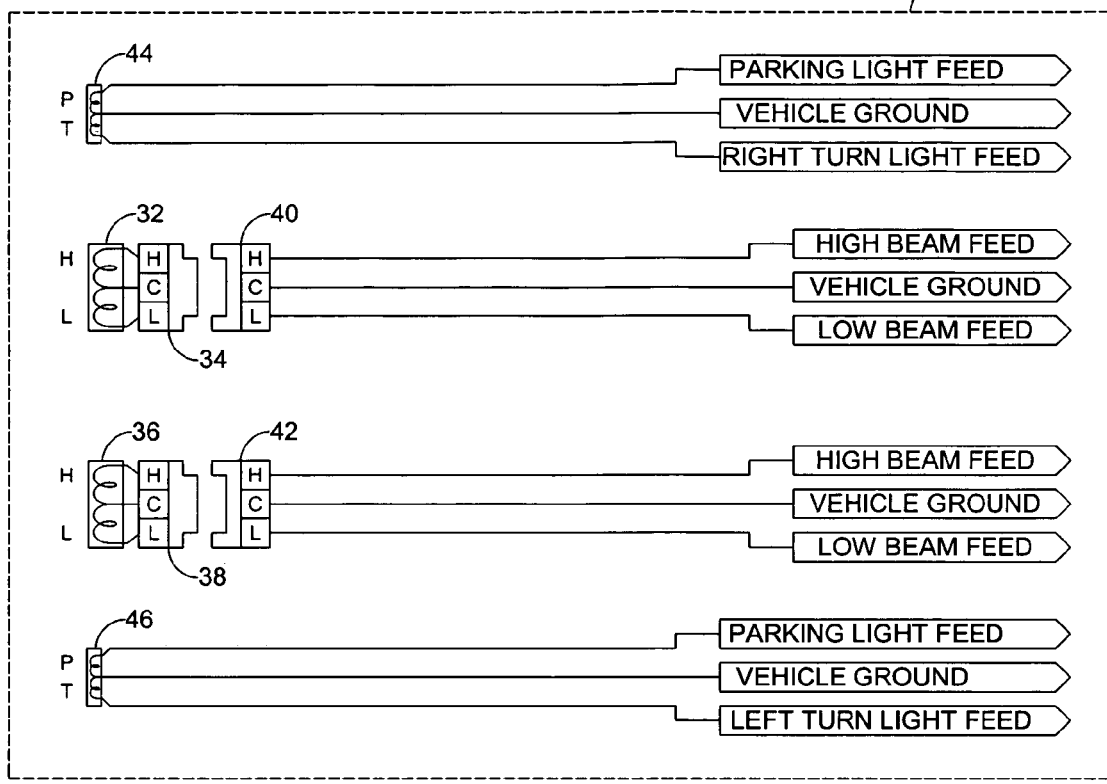
FIG. 1 is a schematic depiction of a portion of a conventional vehicle lighting system showing the lights located at the front of the vehicle, and also showing connectors which are used to connect the two headlights to the vehicle lighting system to provide power to the headlights.

Prior to a description of the preferred embodiment of the present invention, it is helpful to briefly review several of the principal elements of lighting systems used in vehicles and vehicle accessories, and a few features of their common construction. Referring first to FIG. 1, the lights of a conventional vehicle lighting system which are located at the front of a vehicle 30 are illustrated, together with their connection to the electrical system of the vehicle 30. A headlight 32 having a connector element 34 (typically prongs extending from the back side thereof) is located on the right side of the vehicle 30 and a headlight 36 having a connector element 38 (also typically prongs extending from the back side thereof) is located on the left side of the vehicle 30.

A headlight plug 40 is shown for connection to the connector element 34 on the headlight 32, and a headlight plug 42 is shown for connection to the connector element 38 on the headlight 36. The headlight plugs 40 and 42 are shown as each being electrically connected to a high beam feed (a high beam electrically hot connection), a low beam feed (a low beam electrically hot connection), and a vehicle ground. The high beam feed and the vehicle ground are both connected to a high beam filament in each of the headlights 32 and 36, and the low beam feed and the vehicle ground are both connected to a low beam filament in each of the headlights 32 and 36.

Also included in the vehicle 30 is a parking/turn light 44 on the right side of the vehicle 30 and a parking/turn light 46 on the left side of the vehicle 30. The parking/turn lights 44 and 46 are shown as each being electrically connected to a parking light feed (a parking light electrically hot connection), a turn signal feed (a turn signal electrically hot connection), and the vehicle ground. The parking light feed and the vehicle ground are both connected to a parking light filament in each of the parking/turn lights 44 and 46, the right turn signal feed and the vehicle ground are connected to a turn signal filament in the parking/turn light 44, and the left turn signal feed and the vehicle ground are connected to a turn signal filament in the parking/turn light 46.

Figure 2:
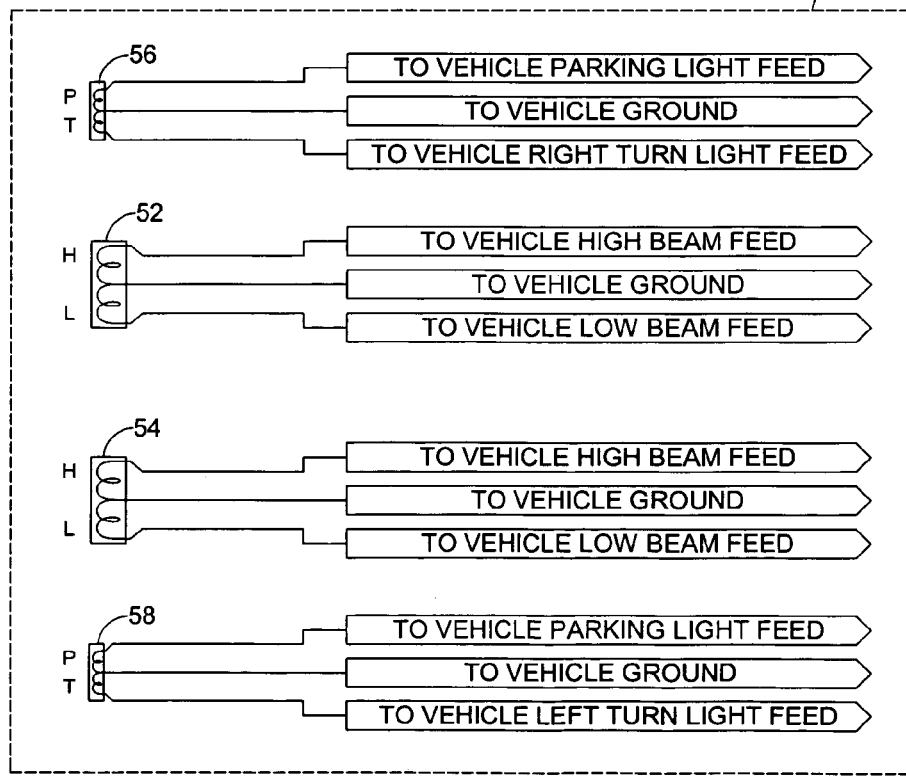
FIG. 2 is a schematic depiction of auxiliary lights located on a vehicle accessory which must be connected to the vehicle lighting system shown in FIG. 1 to operate the auxiliary lights.

Referring next to FIG. 2, the auxiliary lights located on a vehicle accessory 50 to be operated by the vehicle lighting system of the vehicle 30 (shown in FIG. 1) are illustrated, together with connections to be made to the electrical system of the vehicle 30 to operate them. A headlight 52 is located on the right side of the vehicle accessory 50 and a headlight 54 is located on the left side of the vehicle accessory 50. The headlights 52 and 54 are shown as each being electrically connected to a vehicle high beam feed (a high beam electrically hot connection from the vehicle 30), a vehicle low beam feed (a low beam electrically hot connection from the vehicle 30), and a vehicle ground (from the vehicle 30). The vehicle high beam feed and the vehicle ground are both connected to a high beam filament in each of the headlights 52 and 54, and the vehicle low beam feed and the vehicle ground are both connected to a low beam filament in each of the headlights 52 and 54.

Also included in the vehicle accessory 50 is a parking/turn light 56 on the right side of the vehicle accessory 50 and a parking/turn light 58 on the left side of the vehicle accessory 50. The parking/turn lights 56 and 58 are shown as each being electrically connected to a vehicle parking light feed (a parking light electrically hot connection from the vehicle 30), a vehicle turn signal feed (a turn signal electrically hot connection from the vehicle 30), and the vehicle ground (from the vehicle 30). The vehicle parking light feed and the vehicle ground are both connected to a parking light filament in each of the parking/turn lights 56 and 58, the vehicle right turn signal feed and the vehicle ground are connected to a turn signal filament in the parking/turn light 56, and the vehicle left turn signal feed and the vehicle ground are connected to a turn signal filament in the parking/turn light 58.

The independent lighting system of the present invention includes a first harness portion which is for installation into the lighting system of the vehicle 30, and a second harness portion which is for installation into the auxiliary lighting system of the vehicle accessory 50. The first harness portion will be connected to the electrical wiring operating the headlights 32 and 34 by inserting elements of the first harness portion between the connector element 34 of the headlight 32 and the headlight plug 40, and between the connector element 38 of the headlight 36 and the headlight plug 42 (all of which are shown in FIG. 1). In the preferred embodiments, the first harness portion will also be tapped into the electrical wiring operating the parking/turn lights 44 and 46.

The first harness portion in the vehicle 30 has a first configuration when it is not connected to the second harness portion in the vehicle accessory 50, and a second configuration when it is connected to the second harness portion in the vehicle accessory 50. In the first configuration, the first harness portion will allow the headlights 32 and 36 in the vehicle 30 to operate, but in the second configuration, the first harness portion will not allow the headlights 32 and 36 in the vehicle 30 to operate. Instead, the headlights 52 and 54 in the vehicle accessory 50 will be allowed to operate. Changes between the two configurations are accomplished by the independent lighting system of the present invention without using a single switch or relay.

The preferred embodiment of the independent lighting system of the present invention is shown in three embodiments in FIGS. 3 and 4, 5 and 6, and 7 and 8, respectively. In each of these three preferred embodiments, the first harness portion in the vehicle 30 consists of right and left halves, each of which has a harness connector. Similarly the second harness portion in the vehicle accessory 50 also consists of right and left halves, each of which has a harness connector.

In each of the three preferred embodiments, the harness connectors on the right and left halves of the first harness portion are different halves of a mating pair. Likewise, the harness connectors on the right and left halves of the second harness portion are different halves of a mating pair of the same design as the harness connectors of the first harness portion. In the first configuration of the first harness portion, the harness connector on the right half of the first harness portion is connected to the harness connector on the left half of the first harness portion. In the second configuration of the first harness portion, the harness connector on the right half of the first harness portion is connected to the harness connector on the right half of the second harness portion, and the harness connector on the left half of the first harness portion is connected to the harness connector on the left half of the second harness portion.

The harness connectors may be, for example, sealed connectors such as the MX150 series environmentally sealed connectors available from Molex, Inc. of Lisle, Ill. The MX150 connector has connector housings with integrated two-way sealing to form a seal between mating connectors and an integral releasable locking latch to assure positive mating of the connector halves. It will be appreciated by those skilled in the art that when the harness connectors on the right and left sides of the first harness portion in the vehicle 30 are connected together in the first configuration, the right and left connectors of the second harness portion in the vehicle accessory 50 can also be connected together to protect them from exposure to the elements. Thus, in both the first configuration and in the second configuration, all four of the harness connectors on the first and second harness portions are protected, without requiring the use of sealing caps.

Referring first to FIG. 3, a first version of the preferred embodiment of the independent lighting system of the present invention is shown in the first configuration (which is used when the vehicle accessory 50 is not connected to the vehicle 30). The first harness portion consists of a right side first harness portion 60 and a left side first harness portion 62, and the second harness portion consists of a right side second harness portion 64 and a left side second harness portion 66. The right side first harness portion 60 includes a headlight connector 68 which is connected to the connector element 34 of the headlight 32, a headlight power connector 70 which is connected to the headlight plug 40, and a right side first harness connector 72. The left side first harness portion 62 includes a headlight connector 74 which is connected to the connector element 38 of the headlight 36, a headlight power connector 76 which is connected to the headlight plug 42, and a left side first harness connector 78.

Figure 4:
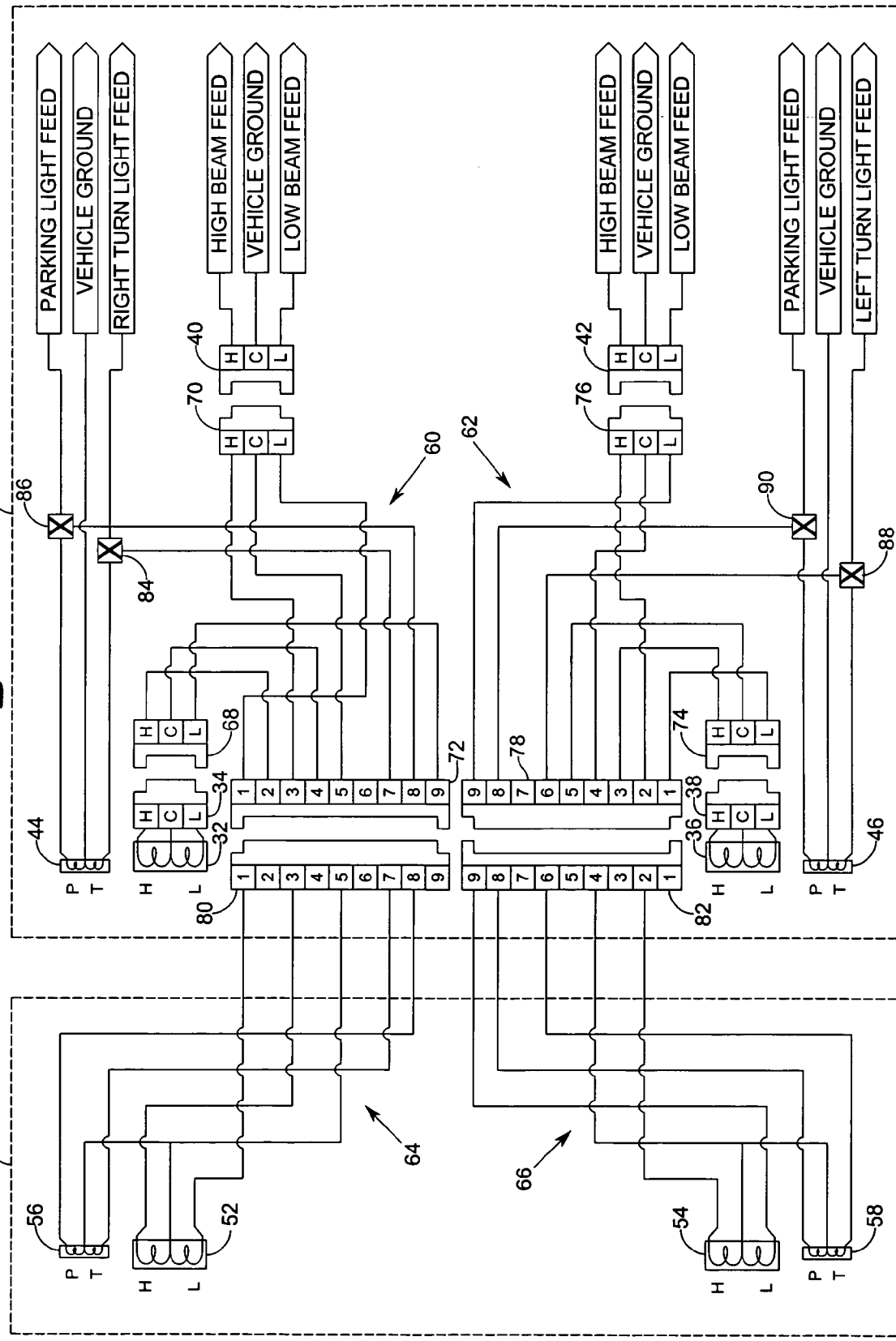
FIG. 4 is a schematic depiction of the first embodiment independent lighting system illustrated in FIG. 3, but with the auxiliary lights connected to the vehicle lighting system.

The right side second harness portion 64 has a right side second harness connector 80, and the left side second harness portion 66 has a left side second harness connector 82. The right side first harness connector 72 will mate with the left side first harness connector 78 or with the right side second harness connector 80, but not with the left side second harness connector 82. The left side first harness connector 78 will mate with the right side first harness connector 72 or with the left side second harness connector 82, but not with the right side second harness connector 80. The right side second harness connector 80 and the left side second harness connector 82 will also mate with each other. In FIGS. 3 and 4, the right side first harness connector 72 and the left side second harness connector 82 are female connectors, and the left side first harness connector 78 and the right side second harness connector 80 are male connectors, but this configuration could be reversed.

In the first version of the preferred embodiment shown in FIGS. 3 and 4, the right side first harness connector 72, the left side first harness connector 78, the right side second harness connector 80, and the left side second harness connector 82 are all nine-pin connectors. With regard to the right side first harness connector 72, pins 1, 3, and 5 are respectively connected to the headlight power connector 70 as the low beam feed, the high beam feed, and the vehicle ground. Pins 2, 4, and 9 of the right side first harness connector 72 are respectively connected to the headlight connector 68 as the high beam lead, the common (ground) lead, and the low beam lead. Pin 7 of the right side first harness connector 72 is connected to the right turn signal feed using a right turn signal feed tap 84, and pin 8 of the right side first harness connector 72 is connected to the parking light feed using a parking light feed tap 86.

With regard to the left side first harness connector 78, Pins 1, 3, and 5 are respectively connected to the headlight connector 74 as the low beam lead, the high beam lead, and the common (ground) lead. Pins 2, 4, and 9 of the left side first harness connector 78 are respectively connected to the headlight power connector 76 as the high beam feed, the vehicle ground, and the low beam feed. Pin 6 of the left side first harness connector 78 is connected to the left turn signal feed using a left turn signal feed tap 88, and Pin 8 of the left side first harness connector 78 is connected to the parking light feed using a parking light feed tap 90.

With regard to the right side second harness connector 80, Pin 1 is connected to the low beam lead of the headlight 52, Pin 3 is connected to the high beam lead of the headlight 52, Pin 5 is connected to the common (ground) leads of both the headlight 52 and the parking/turn light 56, Pin 7 is connected to the right turn signal lead of the parking/turn light 56, and Pin 8 is connected to the parking light feed of the parking/turn light 56. With regard to the left side second harness connector 82, Pin 2 is connected to the high beam lead of the headlight 54, Pin 4 is connected to the common (ground) leads of both the headlight 54 and the parking/turn light 58, Pin 6 is connected to is connected to the left turn signal lead of the parking/turn light 58, Pin 8 is connected to the parking light feed of the parking/turn light 58, and Pin 9 is connected to the low beam lead of the headlight 54.

It will be appreciated by those skilled in the art that the first version of the preferred embodiment illustrated in FIGS. 3 and 4 switches both the hot leads and the common leads from the headlights 32 and 36 of the vehicle 30 to the headlights 52 and 54 of the vehicle accessory 50. When the right side first harness connector 72 and the left side first harness connector 78 are connected together as shown in FIG. 3, the headlights 32 and 36 of the vehicle 30 will be operative. If the right side first harness connector 72 and the left side first harness connector 78 are not connected to each other, the headlights 32 and 36 of the vehicle 30 will be inoperative.

Referring now to FIG. 4, the first version of the preferred embodiment of the independent lighting system of the present invention is shown in the second configuration (which is used when the vehicle accessory 50 is connected to the vehicle 30). When the right side first harness connector 72 is connected to the right side second harness connector 80 and the left side first harness connector 78 is connected to the left side second harness connector 82, the headlights 52 and 54 of the vehicle accessory 50 will be operative, and the headlights 32 and 36 of the vehicle 30 will not be operative.

Figure 5:
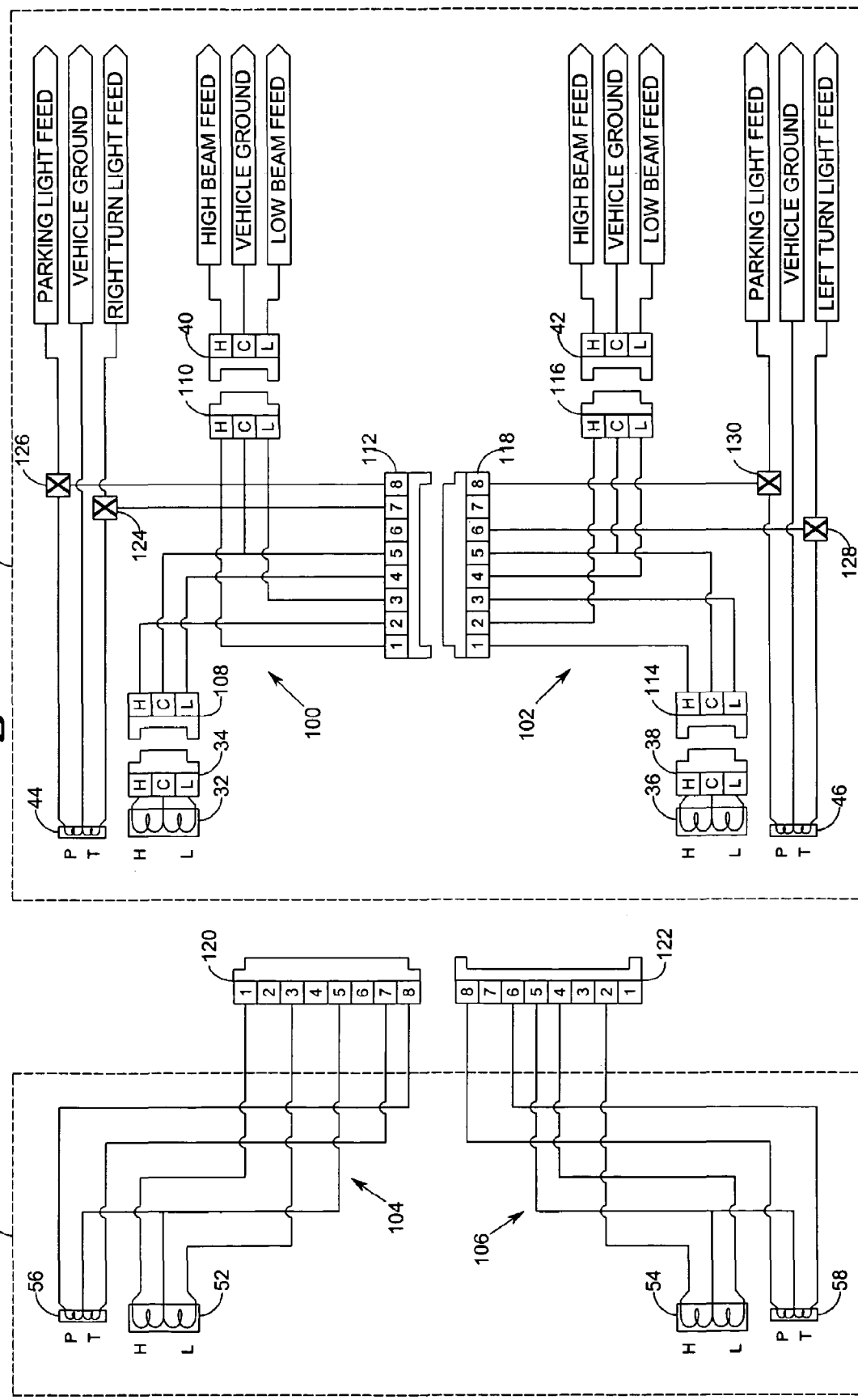
FIG. 5 is a schematic depiction of a second embodiment of an independent lighting system which is constructed according to the teachings of the present invention to connect and operate the auxiliary lights located on a vehicle accessory shown in FIG. 2 to the vehicle lighting system shown in FIG. 1, with the auxiliary lights not connected to the vehicle lighting system.

Referring next to FIG. 5, a second version of the preferred embodiment of the independent lighting system of the present invention is shown in the first configuration (which is used when the vehicle accessory 50 is not connected to the vehicle 30). The first harness portion consists of a right side first harness portion 100 and a left side first harness portion 102, and the second harness portion consists of a right side second harness portion 104 and a left side second harness portion 106. The right side first harness portion 100 includes a headlight connector 108 which is connected to the connector element 34 of the headlight 32, a headlight power connector 110 which is connected to the headlight plug 40, and a right side first harness connector 112. The left side first harness portion 102 includes a headlight connector 114 which is connected to the connector element 38 of the headlight 36, a headlight power connector 116 which is connected to the headlight plug 42, and a left side first harness connector 118.

Figure 6:
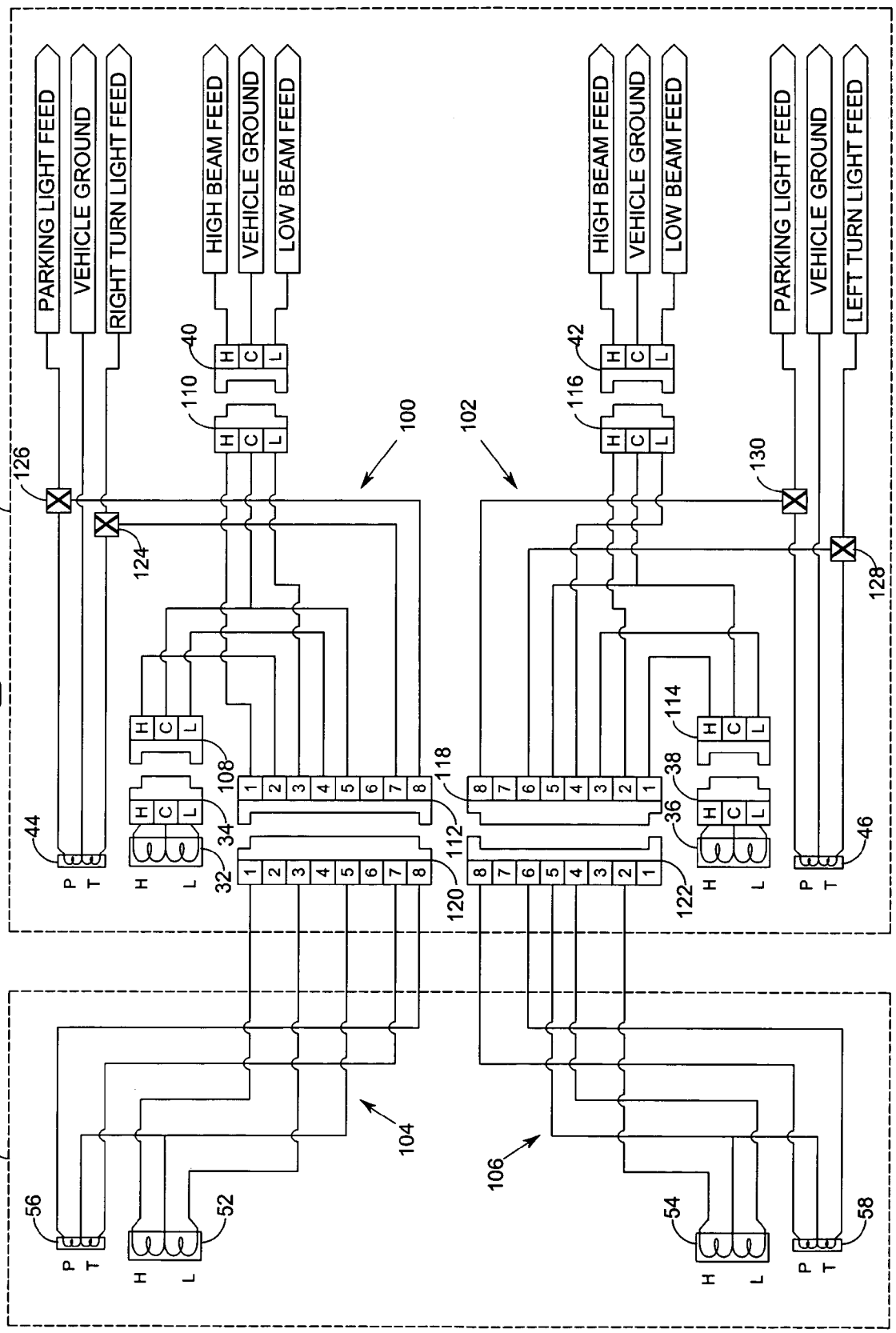
FIG. 6 is a schematic depiction of the second embodiment independent lighting system illustrated in FIG. 5, but with the auxiliary lights connected to the vehicle lighting system.

The right side second harness portion 104 has a right side second harness connector 120, and the left side second harness portion 106 has a left side second harness connector 122. The right side first harness connector 112 will mate with the left side first harness connector 118 or with the right side second harness connector 120, but not with the left side second harness connector 122. The left side first harness connector 118 will mate with the right side first harness connector 112 or with the left side second harness connector 122, but not with the right side second harness connector 120. The right side second harness connector 120 and the left side second harness connector 122 will also mate with each other. In FIGS. 5 and 6, the right side first harness connector 112 and the left side second harness connector 122 are female connectors, and the left side first harness connector 118 and the right side second harness connector 120 are male connectors, but this configuration could be reversed.

In the second version of the preferred embodiment shown in FIGS. 5 and 6, the right side first harness connector 112, the left side first harness connector 118, the right side second harness connector 120, and the left side second harness connector 122 are all eight-pin connectors. With regard to the right side first harness connector 112, pins 1 and 3 are respectively connected to the headlight power connector 110 as the high beam feed and the low beam feed. Pins 2 and 4 of the right side first harness connector 112 are respectively connected to the headlight connector 108 as the high beam lead and the low beam lead. Pin 5 of the right side first harness connector 112 is connected to both the headlight connector 108 as the common (ground) lead and to the headlight power connector 110 as the vehicle ground. Pin 7 of the right side first harness connector 112 is connected to the right turn signal feed using a right turn signal feed tap 124, and pin 8 of the right side first harness connector 112 is connected to the parking light feed using a parking light feed tap 126.

With regard to the left side first harness connector 118, pins 1 and 3 are respectively connected to the headlight connector 114 as the high beam lead and the low beam lead. Pins 2 and 4 of the left side first harness connector 118 are respectively connected to the headlight power connector 116 as the high beam feed and the low beam feed. Pin 5 of the left side first harness connector 118 is connected to both the headlight connector 114 as the common (ground) lead and to the headlight power connector 116 as the vehicle ground. Pin 6 of the left side first harness connector 118 is connected to the left turn signal feed using a left turn signal feed tap 128, and pin 8 of the left side first harness connector 118 is connected to the parking light feed using a parking light feed tap 130.

With regard to the right side second harness connector 120, pin 1 is connected to the high beam lead of the headlight 52, pin 3 is connected to the low beam lead of the headlight 52, pin 5 is connected to the common (ground) leads of both the headlight 52 and the parking/turn light 56, pin 7 is connected to the right turn signal lead of the parking/turn light 56, and pin 8 is connected to the parking light feed of the parking/turn light 56. With regard to the left side second harness connector 122, pin 2 is connected to the high beam lead of the headlight 54, pin 4 is connected to the low beam lead of the headlight 54, pin 5 is connected to the common (ground) leads of both the headlight 54 and the parking/turn light 58, pin 6 is connected to the left turn signal lead of the parking/turn light 58, and pin 8 is connected to the parking light feed of the parking/turn light 58.

It will be appreciated by those skilled in the art that the second version of the preferred embodiment illustrated in FIGS. 5 and 6 switches only the hot leads from the headlights 32 and 36 of the vehicle 30 to the headlights 52 and 54 of the vehicle accessory 50. When the right side first harness connector 112 and the left side first harness connector 118 are connected together as shown in FIG. 5, the headlights 32 and 36 of the vehicle 30 will be operative. If the right side first harness connector 112 and the left side first harness connector 118 are not connected to each other, the headlights 32 and 36 of the vehicle 30 will be inoperative.

Referring now to FIG. 6, the second version of the preferred embodiment of the independent lighting system of the present invention is shown in the second configuration (which is used when the vehicle accessory 50 is connected to the vehicle 30). When the right side first harness connector 112 is connected to the right side second harness connector 120 and the left side first harness connector 118 is connected to the left side second harness connector 122, the headlights 52 and 54 of the vehicle accessory 50 will be operative, and the headlights 32 and 36 of the vehicle 30 will not be operative.

Figure 7:
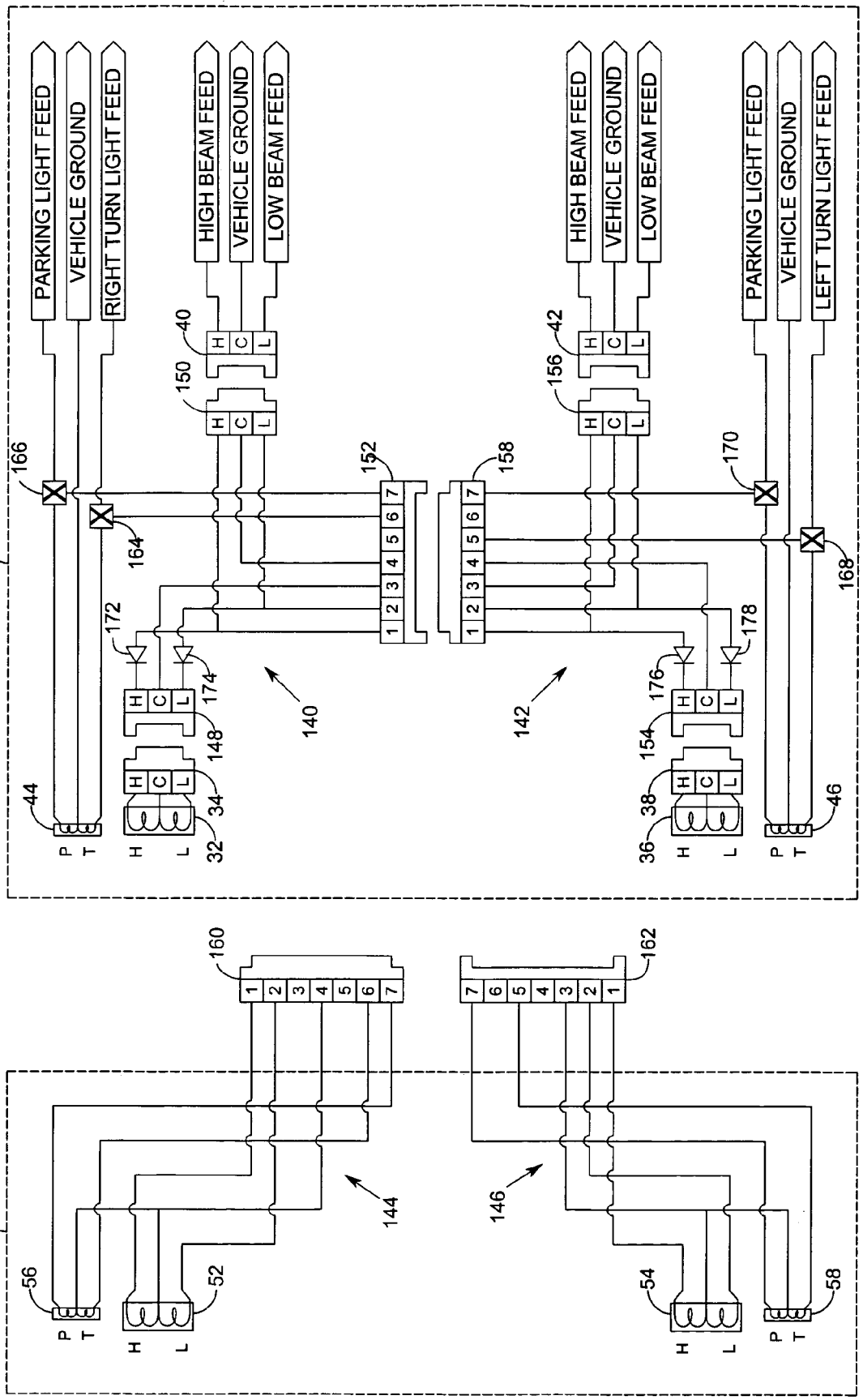
FIG. 7 is a schematic depiction of a third embodiment of an independent lighting system which is constructed according to the teachings of the present invention to connect and operate the auxiliary lights located on a vehicle accessory shown in FIG. 2 to the vehicle lighting system shown in FIG. 1, with the auxiliary lights not connected to the vehicle lighting system.

Referring next to FIG. 7, a third version of the preferred embodiment of the independent lighting system of the present invention is shown in the first configuration (which is used when the vehicle accessory 50 is not connected to the vehicle 30). The first harness portion consists of a right side first harness portion 140 and a left side first harness portion 142, and the second harness portion consists of a right side second harness portion 144 and a left side second harness portion 146. The right side first harness portion 140 includes a headlight connector 148 which is connected to the connector element 34 of the headlight 32, a headlight power connector 150 which is connected to the headlight plug 40, and a right side first harness connector 152. The left side first harness portion 142 includes a headlight connector 154 which is connected to the connector element 38 of the headlight 36, a headlight power connector 156 which is connected to the headlight plug 42, and a left side first harness connector 158.

Figure 8:
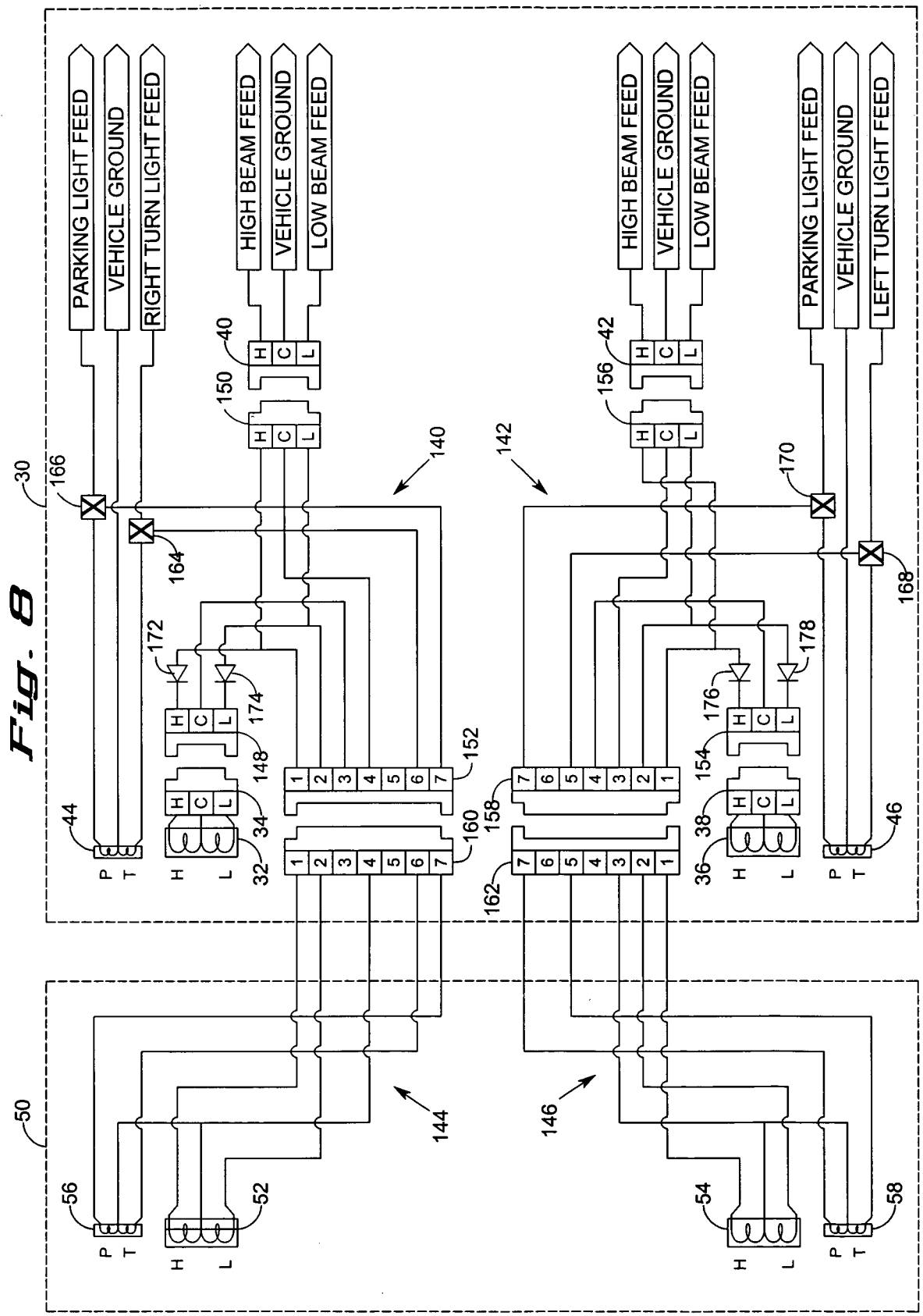
FIG. 8 is a schematic depiction of the third embodiment independent lighting system illustrated in FIG. 7, but with the auxiliary lights connected to the vehicle lighting system.

The right side second harness portion 144 has a right side second harness connector 160, and the left side second harness portion 146 has a left side second harness connector 162. The right side first harness connector 152 will mate with the left side first harness connector 158 or with the right side second harness connector 160, but not with the left side second harness connector 162. The left side first harness connector 158 will mate with the right side first harness connector 152 or with the left side second harness connector 162, but not with the right side second harness connector 160. The right side second harness connector 160 and the left side second harness connector 162 will also mate with each other. In FIGS. 7 and 8, the right side first harness connector 152 and the left side second harness connector 162 are female connectors, and the left side first harness connector 158 and the right side second harness connector 160 are male connectors, but this configuration could be reversed.

In the third version of the preferred embodiment shown in FIGS. 7 and 8, the right side first harness connector 152, the left side first harness connector 158, the right side second harness connector 160, and the left side second harness connector 162 are all seven-pin connectors. With regard to the right side first harness connector 152, pin 3 is connected to the headlight connector 148 as the common (ground) lead, and pin 4 is connected to the headlight power connector 150 as the vehicle ground. Pin 1 is connected both to the headlight connector 148 as the high beam lead and to the headlight power connector 150 as the high beam feed. Pin 2 is connected both to the headlight connector 148 as the low beam lead and to the headlight power connector 150 as the low beam feed. Pin 6 of the right side first harness connector 152 is connected to the right turn signal feed using a right turn signal feed tap 164, and pin 7 of the right side first harness connector 152 is connected to the parking light feed using a parking light feed tap 166.

With regard to the left side first harness connector 158, pin 3 is connected to the headlight power connector 156 as the vehicle ground, and pin 4 is connected to the headlight connector 154 as the common (ground) lead. Pin 1 is connected both to the headlight connector 154 as the high beam lead and to the headlight power connector 156 as the high beam feed. Pin 2 is connected both to the headlight connector 154 as the low beam lead and to the headlight power connector 156 as the low beam feed. Pin 5 of the left side first harness connector 158 is connected to the left turn signal feed using a left turn signal feed tap 168, and pin 7 of the left side first harness connector 158 is connected to the parking light feed using a parking light feed tap 170.

It will be noted that there are also four diodes 172, 174, 176, and 178 which are used in the version of the independent lighting system of the present invention shown in FIGS. 7 and 8. The diode 172 is located with its cathode connected to the high beam lead of the headlight connector 148 and its anode connected to the high beam feed of the headlight power connector 150. The diode 174 is located with its cathode connected to the low beam lead of the headlight connector 148 and its anode connected to the low beam feed of the headlight power connector 150. The diode 176 is located with its cathode connected to the high beam lead of the headlight connector 154 and its anode connected to the high beam feed of the headlight power connector 156. The diode 178 is located with its cathode connected to the low beam lead of the headlight connector 154 and its anode connected to the low beam feed of the headlight power connector 156.

With regard to the right side second harness connector 160, pin 1 is connected to the high beam lead of the headlight 52, pin 2 is connected to the low beam lead of the headlight 52, pin 4 is connected to the common (ground) leads of both the headlight 52 and the parking/turn light 56, pin 6 is connected to the right turn signal lead of the parking/turn light 56, and pin 7 is connected to the parking light feed of the parking/turn light 56. With regard to the left side second harness connector 162, pin 1 is connected to the high beam lead of the headlight 54, pin 2 is connected to the low beam lead of the headlight 54, pin 3 is connected to the common (ground) leads of both the headlight 54 and the parking/turn light 58, pin 5 is connected to is connected to the left turn signal lead of the parking/turn light 58, pin 7 is connected to the parking light feed of the parking/turn light 58.

It will be appreciated by those skilled in the art that the third version of the preferred embodiment illustrated in FIGS. 7 and 8 switches only the common leads from the headlights 32 and 36 of the vehicle 30 to the headlights 52 and 54 of the vehicle accessory 50. When the right side first harness connector 152 and the left side first harness connector 158 are connected together as shown in FIG. 7, the headlights 32 and 36 of the vehicle 30 will be operative. If the right side first harness connector 152 and the left side first harness connector 158 are not connected to each other, the headlights 32 and 36 of the vehicle 30 will be inoperative.

The diodes 172, 174, 176, and 178 act to prevent reverse current paths through the high and low beams of the headlights 32 and 36 of the vehicle 30 and the nonoperated one of the high and low beam bulbs in each of the headlights 52 and 54 of the vehicle accessory 50. Without the diodes 172, 174, 176, and 178, the high and low beams of the headlights 32 and 36 of the vehicle 30 and the nonoperated one of the high and low beam bulbs in each of the headlights 52 and 54 of the vehicle accessory 50 will all be dimly illuminated whenever the other one of headlights 52 and 54 of the vehicle accessory 50, resulting in a higher level of current drain.

Referring now to FIG. 8, the third version of the preferred embodiment of the independent lighting system of the present invention is shown in the second configuration (which is used when the vehicle accessory 50 is connected to the vehicle 30). When the right side first harness connector 152 is connected to the right side second harness connector 160 and the left side first harness connector 158 is connected to the left side second harness connector 162, the headlights 52 and 54 of the vehicle accessory 50 will be operative, and the headlights 32 and 36 of the vehicle 30 will not be operative.

Figure 9:
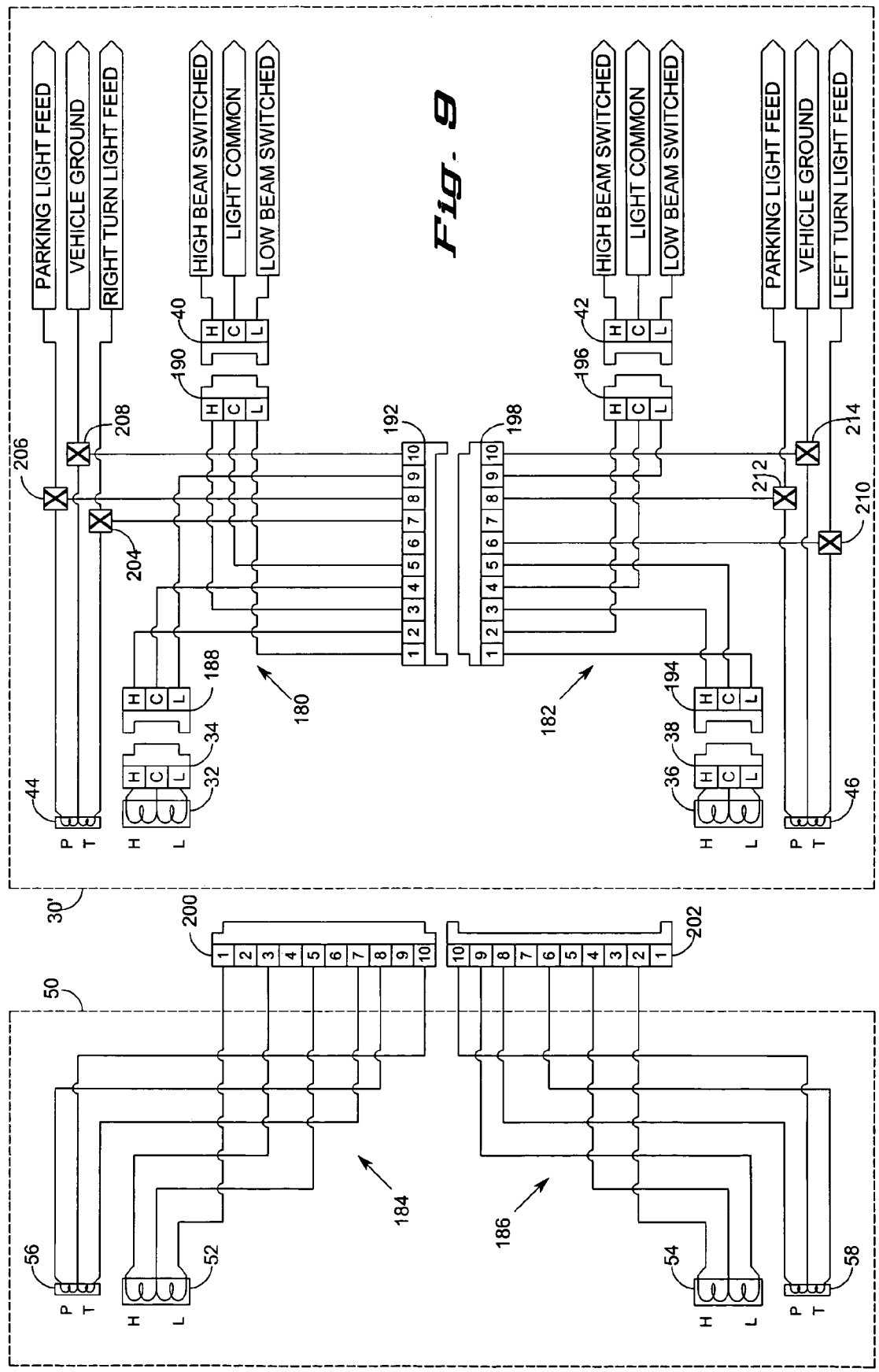
FIG. 9 is a schematic depiction of a fourth embodiment of an independent lighting system which is constructed according to the teachings of the present invention to connect and operate the auxiliary lights located on a vehicle accessory shown in FIG. 2 to a vehicle lighting system like that shown in FIG. 1 but optionally without vehicle ground used as the common for the vehicle headlights, with the auxiliary lights not connected to the vehicle lighting system.

Referring next to FIG. 9, a fourth version of the preferred embodiment of the independent lighting system of the present invention is shown in the first configuration (which is used when the vehicle accessory 50 is not connected to a vehicle 30'). This version is designed to work on either the conventional vehicle 30 shown in FIG. 2, or on the vehicle 30' which (unlike the conventional vehicle 30 shown in FIG. 2) does not use the vehicle ground as the common lead for the vehicle headlights. Such vehicles may use the vehicle power as the common lead, in which case the common lead from the headlight controls and the ground lead from the parking/turn lights cannot be connected together as is the case in the first, second, and third versions respectively illustrated in FIGS. 3 and 4, FIGS. 5 and 6, and FIGS. 7 and 8.

The first harness portion consists of a right side first harness portion 180 and a left side first harness portion 182, and the second harness portion consists of a right side second harness portion 184 and a left side second harness portion 186. The right side first harness portion 180 includes a headlight connector 188 which is connected to the connector element 34 of the headlight 32, a headlight power connector 190 which is connected to the headlight plug 40, and a right side first harness connector 192. The left side first harness portion 182 includes a headlight connector 194 which is connected to the connector element 38 of the headlight 36, a headlight power connector 196 which is connected to the headlight plug 42, and a left side first harness connector 198.

Figure 10:
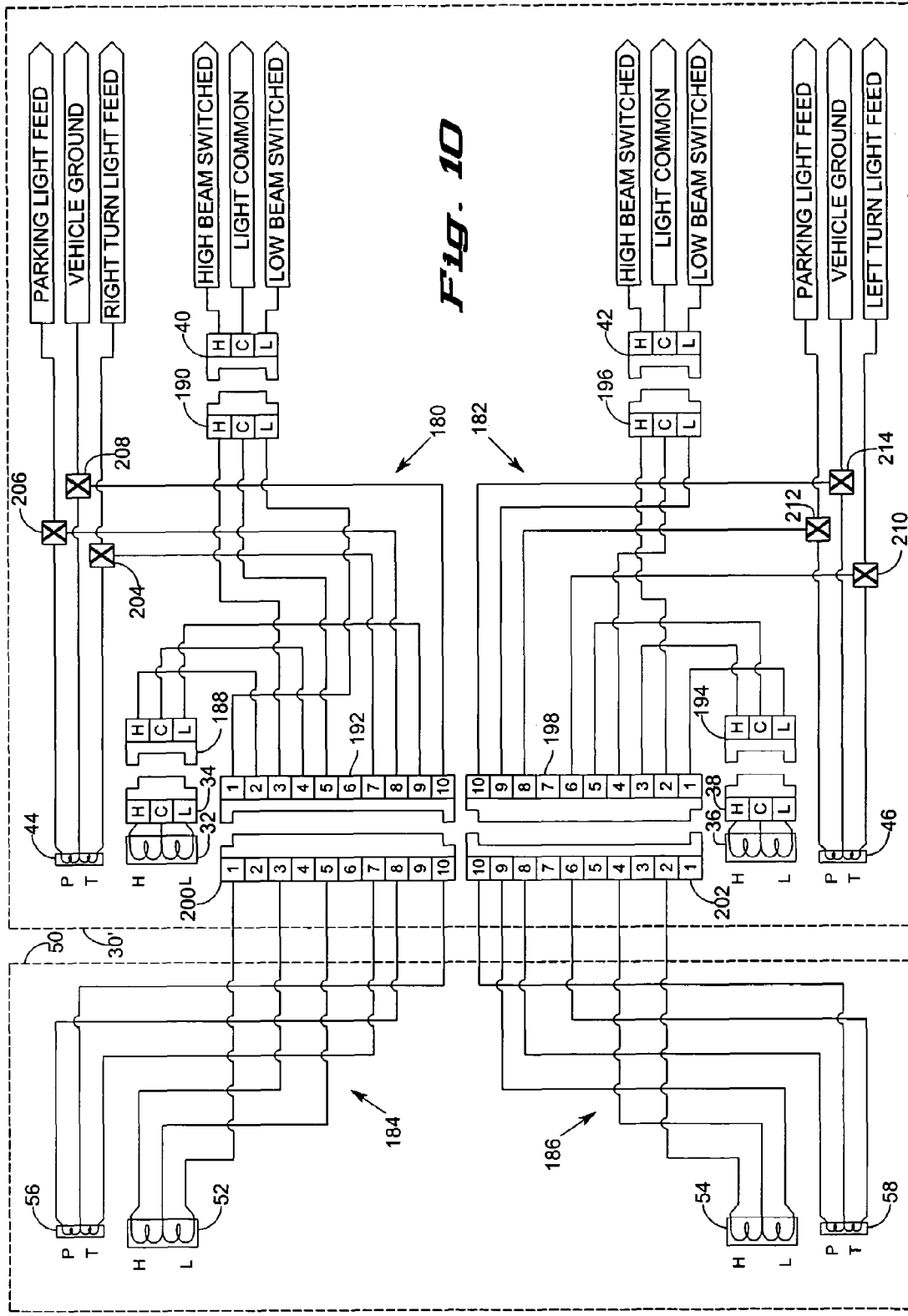
FIG. 10 is a schematic depiction of the fourth embodiment independent lighting system illustrated in FIG. 9, but with the auxiliary lights connected to the vehicle lighting system.

The right side second harness portion 184 has a right side second harness connector 200, and the left side second harness portion 186 has a left side second harness connector 202. The right side first harness connector 192 will mate with the left side first harness connector 198 or with the right side second harness connector 200, but not with the left side second harness connector 202. The left side first harness connector 198 will mate with the right side first harness connector 192 or with the left side second harness connector 202, but not with the right side second harness connector 200. The right side second harness connector 200 and the left side second harness connector 202 will also mate with each other. In FIGS. 9 and 10, the right side first harness connector 192 and the left side second harness connector 202 are female connectors, and the left side first harness connector 198 and the right side second harness connector 200 are male connectors, but this configuration could be reversed.

In the fourth version of the preferred embodiment shown in FIGS. 9 and 10, the right side first harness connector 192, the left side first harness connector 198, the right side second harness connector 200, and the left side second harness connector 202 are all ten-pin connectors. With regard to the right side first harness connector 192, Pin 1 is connected to the headlight power connector 190 as the low beam feed, pin 3 is connected to the headlight power connector 190 as the high beam feed, and Pin 5 is connected to the headlight power connector 190 as the common feed. Pin 2 is connected to the headlight connector 188 as the high beam lead, Pin 4 is connected to the headlight connector 188 as the common lead, and Pin 9 is connected to the headlight connector 188 as the low beam feed. Pin 7 is connected to the right turn signal feed using a right turn signal feed tap 204, Pin 8 is connected to the right parking light feed using a right parking light feed tap 206, and Pin 10 is connected to the right parking/turn light ground feed using a right parking/turn light ground feed tap 208.

With regard to the left side first harness connector 198, Pin 2 is connected to the headlight power connector 196 as the high beam feed, pin 4 is connected to the headlight power connector 196 as the common feed, and Pin 9 is connected to the headlight power connector 196 as the low beam feed. Pin 1 is connected to the headlight connector 194 as the low beam lead, Pin 3 is connected to the headlight connector 194 as the high beam lead, and Pin 5 is connected to the headlight connector 194 as the common feed. Pin 6 is connected to the left turn signal feed using a left turn signal feed tap 210, Pin 8 is connected to the left parking light feed using a left parking light feed tap 212, and Pin 10 is connected to the left parking/turn light ground feed using a left parking/turn light ground feed tap 214.

With regard to the right side second harness connector 200, Pin 1 is connected to the low beam lead of the headlight 52, Pin 3 is connected to the high beam lead of the headlight 52, Pin 5 is connected to the common lead of the headlight 52, Pin 7 is connected to the right turn signal lead of the parking/turn light 56, Pin 8 is connected to the parking light feed of the parking/turn light 56, and Pin 10 is connected to the common lead of the parking/turn light 56. With regard to the left side second harness connector 202, Pin 2 is connected to the high beam lead of the headlight 54, Pin 4 is connected to the common lead of the headlight 54, Pin 9 is connected to the low beam lead of the headlight 54, Pin 6 is connected to is connected to the left turn signal lead of the parking/turn light 58, Pin 8 is connected to the parking light feed of the parking/turn light 58, and Pin 10 is connected to the common lead of the parking/turn light 58.

It will be appreciated by those skilled in the art that the fourth version of the preferred embodiment illustrated in FIGS. 9 and 10 switches both the hot leads and the common leads from the headlights 32 and 36 of the vehicle 30' to the headlights 52 and 54 of the vehicle accessory 50, and also independently connects the hot leads and the common leads from the parking/turn lights 44 and 46 of the vehicle 30' to the parking/turn lights 56 and 58 of the vehicle accessory 50.

When the right side first harness connector 192 and the left side first harness connector 198 are connected together as shown in FIG. 9, the headlights 32 and 36 of the vehicle 30' will be operative. If the right side first harness connector 192 and the left side first harness connector 198 are not connected to each other, the headlights 32 and 36 of the vehicle 30' will be inoperative.

Referring now to FIG. 10, the fourth version of the preferred embodiment of the independent lighting system of the present invention is shown in the second configuration (which is used when the vehicle accessory 50 is connected to the vehicle 30'). When the right side first harness connector 192 is connected to the right side second harness connector 200 and the left side first harness connector 198 is connected to the left side second harness connector 202, the headlights 52 and 54 of the vehicle accessory 50 will be operative, and the headlights 32 and 36 of the vehicle 30' will not be operative.

Figure 11:
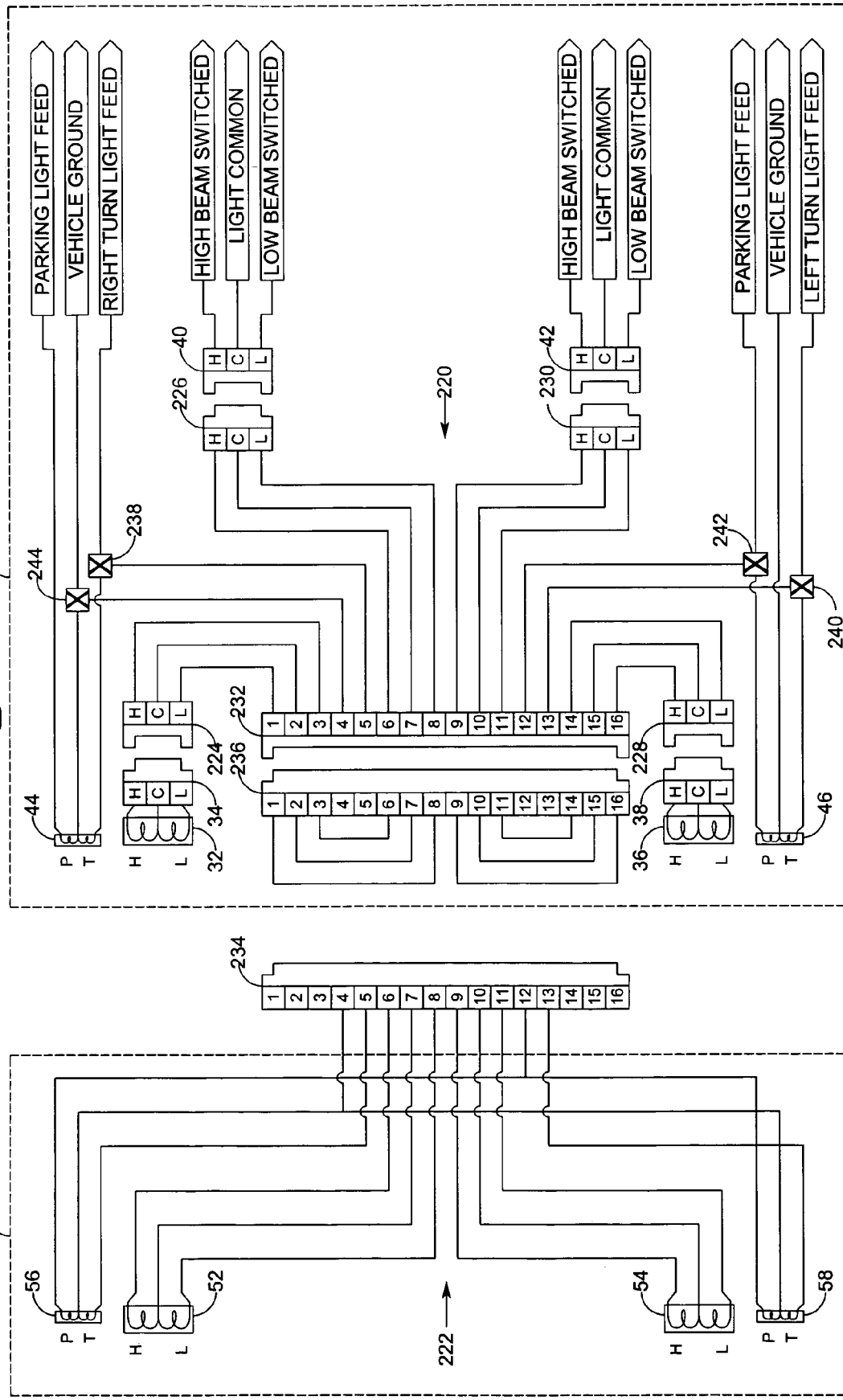
FIG. 11 is a schematic depiction of an alternate embodiment of an independent lighting system which is constructed according to the teachings of the present invention to connect and operate the auxiliary lights located on a vehicle accessory shown in FIG. 2 to like that shown in FIG. 1 but optionally without vehicle ground used as the common for the vehicle headlights, with the auxiliary lights not connected to the vehicle lighting system.
Figure 12:
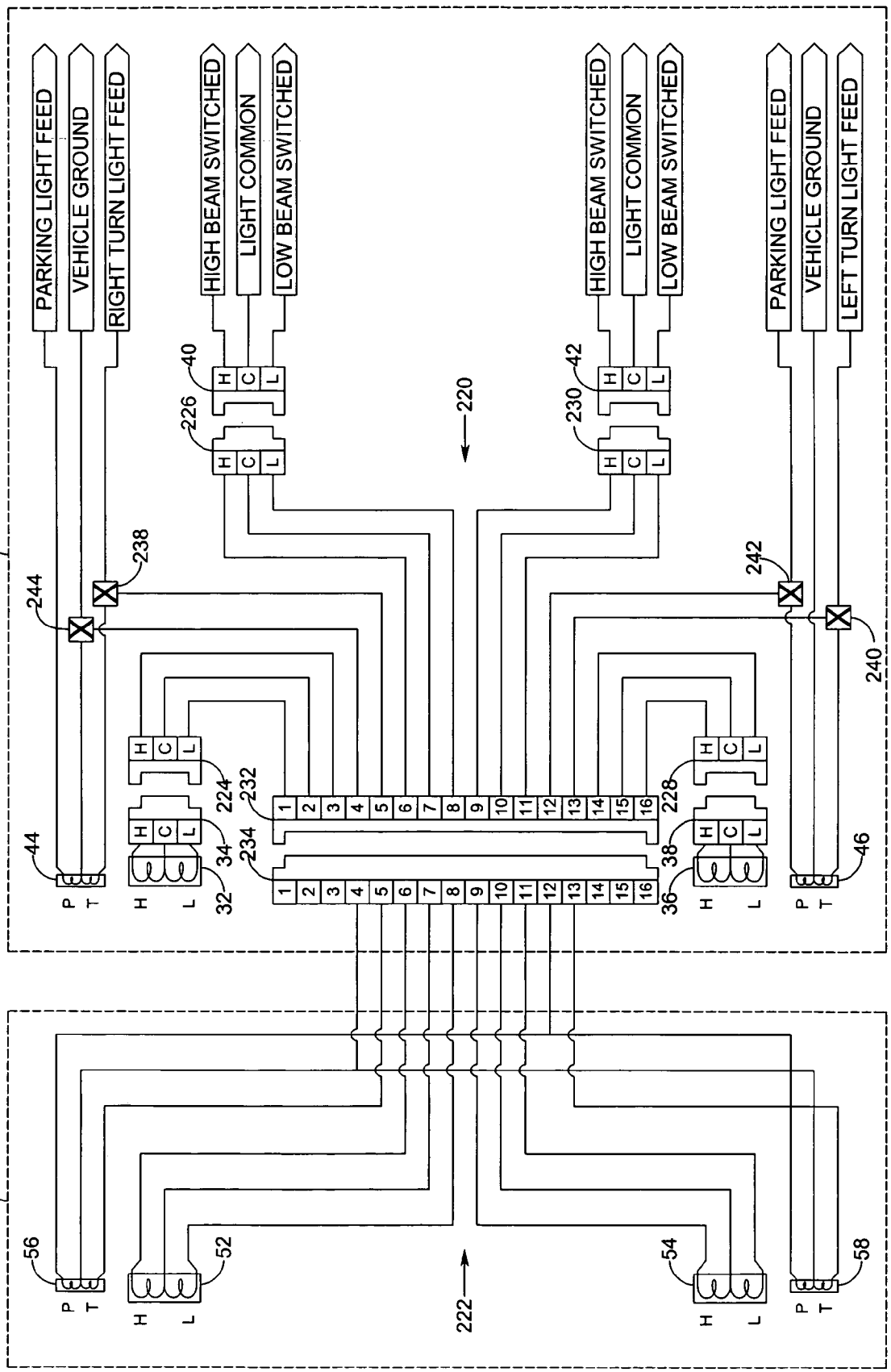
FIG. 12 is a schematic depiction of the alternate embodiment independent lighting system illustrated in FIG. 9, but with the auxiliary lights connected to the vehicle lighting system.

An alternate embodiment of the independent lighting system of the present invention is shown in FIGS. 11 and 12. In this alternate embodiment, there is a single first harness portion 220 which is located in the vehicle 30' and a single second harness portion 222 which is located on the vehicle accessory 50, and each contains only a single harness connector. This version is also designed to work on either the conventional vehicle 30 shown in FIG. 2, or on the vehicle 30' which (unlike the conventional vehicle 30 shown in FIG. 2) does not use the vehicle ground as the common lead for the vehicle headlights.

The first harness portion 220 includes a headlight connector 224 which is connected to the connector element 34 of the headlight 32, a headlight power connector 226 which is connected to the headlight plug 40, a headlight connector 228 which is connected to the connector element 38 of the headlight 36, a headlight power connector 230 which is connected to the headlight plug 42, and a first harness connector 232. The second harness portion 222 has a second harness connector 234.

Also included in the alternate embodiment illustrated in FIG. 11 is a jumpered connector 236. The first harness connector 232 will mate with the jumpered connector 236 or with the second harness connector 234. In FIGS. 11 and 12, the first harness connector 232 is a female connector and the second harness connector 234 and the jumpered connector 236 are male connectors, but this configuration could be reversed.

In the embodiment shown in FIGS. 11 and 12, the first harness connector 232, the second harness connector 234, and the jumpered connector 236 are each sixteen-pin connectors. With regard to the first harness connector 232, Pin 1 is connected to the headlight connector 224 as the low beam lead, Pin 2 is connected to the headlight connector 224 as the common lead, and Pin 3 is connected to the headlight connector 224 as the high beam lead. Pin 6 is connected to the headlight power connector 226 as the high beam feed, Pin 7 is connected to the headlight power connector 226 as the common feed, and Pin 8 is connected to the headlight power connector 226 as the low beam feed.

Pin 14 is connected to the headlight connector 228 as the low beam lead, Pin 15 is connected to the headlight connector 228 as the common lead, and Pin 16 is connected to the headlight connector 228 as the high beam lead. Pin 9 is connected to the headlight power connector 230 as the high beam feed, Pin 10 is connected to the headlight power connector 230 as the common feed, and Pin 11 is connected to the headlight power connector 230 as the low beam feed.

Pin 5 is connected to the right turn signal feed using a right turn signal feed tap 238, and Pin 13 is connected to the left turn signal feed using a left turn signal feed tap 240. Pin 12 is connected to the left parking light feed using a parking light feed tap 242 (but could alternately be connected to the right parking light feed instead). Pin 4 is connected to the right parking/turn light ground feed using a parking/turn light ground feed tap 244 (but could alternately be connected to the left parking/turn light ground feed instead).

With regard to the second harness connector 234, Pin 6 is connected to the high beam lead of the headlight 52, Pin 7 is connected to the common lead of the headlight 52, and Pin 8 is connected to the low beam lead of the headlight 52. Pin 9 is connected to the high beam lead of the headlight 54, Pin 10 is connected to the common lead of the headlight 54, and Pin 11 is connected to the low beam lead of the headlight 54. Pin 5 is connected to the right turn signal lead of the parking/turn light 56, and Pin 13 is connected to the left turn signal lead of the parking/turn light 58. Pin 12 is connected to the parking light feed of the parking/turn lights 56 and 58, and Pin 4 is connected to the common lead of the parking/turn lights 56 and 58.

With regard to the jumpered connector 236, Pin 1 is jumpered to Pin 8, Pin 2 is jumpered to Pin 7, Pin 3 is jumpered to Pin 6, Pin 9 is jumpered to Pin 16, Pin 10 is jumpered to Pin 15, Pin 11 is jumpered to Pin 14.

It will be appreciated by those skilled in the art that the alternate embodiment illustrated in FIGS. 11 and 12 switches both the hot leads and the common leads from the headlights 32 and 36 of the vehicle 30' to the headlights 52 and 54 of the vehicle accessory 50, and also independently connects the hot leads and the common leads from the parking/turn lights 44 and 46 of the vehicle 30' to the parking/turn lights 56 and 58 of the vehicle accessory 50. (Those skilled in the art will appreciate that designs using single first and second harness connectors could instead be implemented with either the hot leads being switched or with only the common leads being switched and diodes being used as in the third version of the preferred embodiment illustrated in FIGS. 7 and 8.) When the jumpered connector 236 is connected to the first harness connector 232 as shown in FIG. 11, the headlights 32 and 36 of the vehicle 30' will be operative. If the first harness connector 232 and the jumper connector 236 are not connected to each other, the headlights 32 and 36 of the vehicle 30' will be inoperative.

Referring now to FIG. 12, the alternate embodiment of the independent lighting system of the present invention is shown in the second configuration (which is used when the vehicle accessory 50 is connected to the vehicle 30'). When the first harness connector 232 is connected to the second harness connector 234, the headlights 52 and 54 of the vehicle accessory 50 will be operative, and the headlights 32 and 36 of the vehicle 30' will not be operative.

Figure 13:
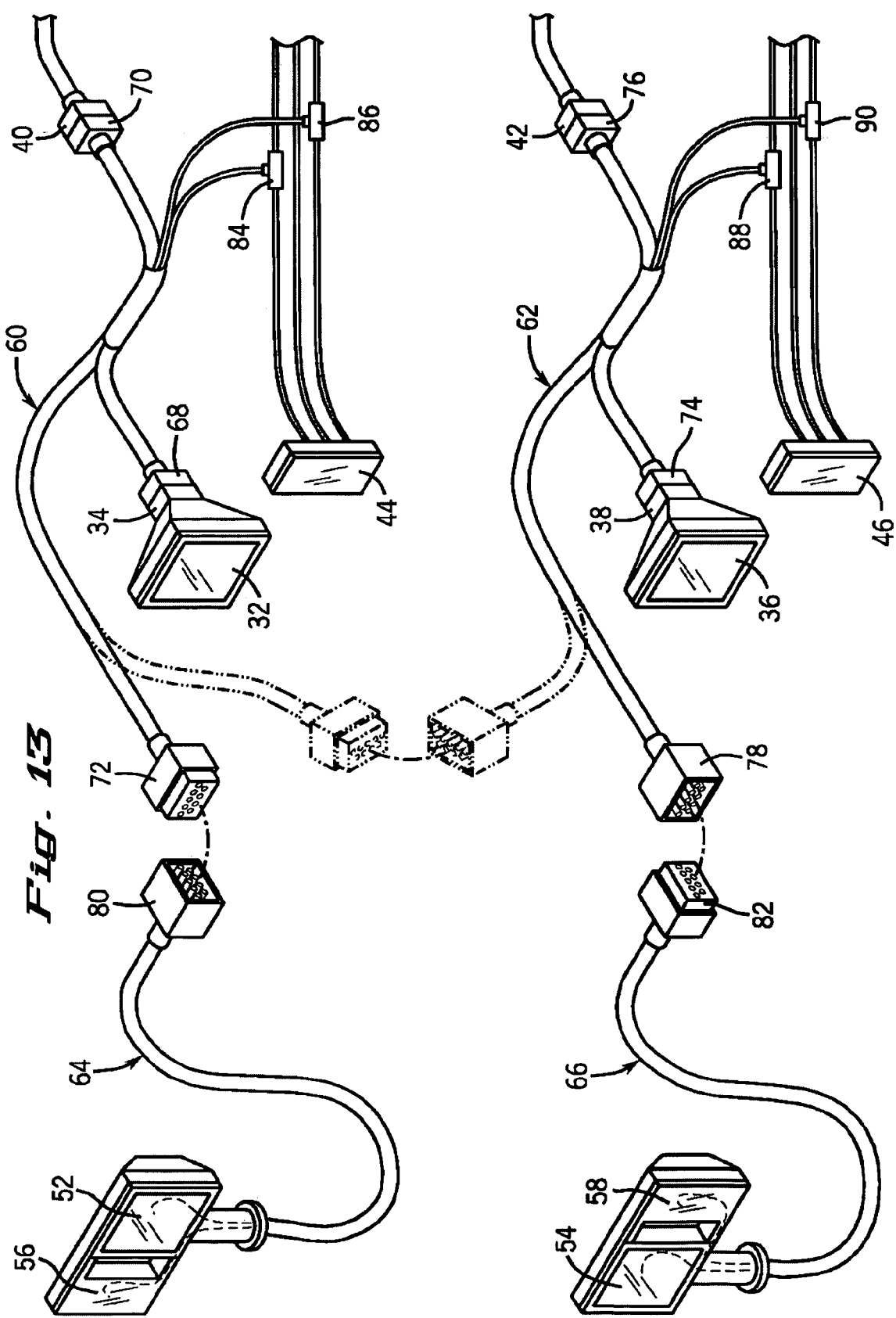
FIG. 13 is an isometric view showing the independent lighting system of the present invention installed intermediate the lights of a conventional vehicle lighting system that are located at the front of the vehicle and the auxiliary lights of a vehicle accessory for installation onto the front of the vehicle.

Referring finally to FIG. 13, the first version of the preferred embodiment of the independent lighting system of the present invention, which was illustrated in FIGS. 3 and 4, is illustrated is simplified form as it would likely appear, with the same reference numerals used in FIGS. 3 and 4 being used in FIG. 13. The right side first harness connector 72 is shown in position for connection to the right side second harness connector 80 to operate the headlight 52 and the parking/turn light 56 on the vehicle accessory 50 (the vehicle accessory 50 is not shown in FIG. 11), and the left side first harness connector 78 is shown in position for connection to the left side second harness connector 82 to operate the headlight 54 and the parking/turn light 58 on the vehicle accessory 50. In this position, the headlights 32 and 36 of the vehicle 30 (the vehicle 30 is not shown in FIG. 11) will be inoperative. The right side first harness connector 72 and the left side first harness connector 78 are shown in position for connection together in phantom lines to render the headlights 32 and 36 operative when the vehicle accessory 50 has been removed from the vehicle 30.

It may therefore be appreciated from the above detailed description of the preferred embodiment of the present invention that it teaches an independent lighting system which facilitates the operation of auxiliary headlights by automatically disconnecting the vehicle headlights whenever the auxiliary headlights are connected for operation with the lighting system of the vehicle. The independent lighting system of the present invention completely eliminates the need for any type of switch to choose between the vehicle headlights and the auxiliary headlights due to its design that allows the mere connection of the wiring harness of the front-mounted vehicle accessory to the wiring harness of the vehicle to disconnect the vehicle headlights and to connect the auxiliary. The independent lighting system of the present invention also eliminates the need for any relays or additional electronic components to perform a switching function between the vehicle headlights and the auxiliary headlights.

The independent lighting system of the present invention features a simplified design which does not require any wiring or other connection to the passenger compartment of the vehicle in which it is installed. The independent lighting system of the present invention is relatively simple and quick to install, and that it requires neither advanced knowledge of vehicle electrical systems nor special tools in order to accomplish its installation. The independent lighting system of the present invention provides sealed connectors to protect against the elements to which it will be exposed in operation, and does not rely upon the need for connector caps to protect its connectors, but rather eliminates the need for such caps entirely, thereby precluding the possibility of their loss or misplacement.

The independent lighting system of the present invention is of a construction which is both durable and long lasting, and will require little or no maintenance to be provided by the user throughout its operating lifetime. The independent lighting system of the present invention is also of inexpensive construction to enhance its market appeal and to thereby afford it the broadest possible market. Finally, all of the aforesaid advantages and objectives of the independent lighting system of the present invention are achieved without incurring any substantial relative disadvantage.

Although the foregoing description of the independent lighting system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. An independent lighting system for connecting an auxiliary headlight to the lighting system of a vehicle, the vehicle having a vehicle headlight and a headlight plug which supplies power from the lighting system of the vehicle to the vehicle headlight, said independent lighting system comprising:
   a headlight connector for connection to the vehicle headlight in place of the headlight plug;
   a headlight power connector for connection to the headlight plug;
   a first harness connector which is electrically connected to said headlight connector and to said headlight power connector;
   a second harness connector for removable connection to said first harness connector, wherein said second harness connector may be removably connected to said first harness connector to enable the operation of the vehicle headlight by the lighting system of the vehicle; and
   a third harness connector which is electrically connected to the auxiliary headlight, wherein said third harness connector may be removably connected to said first harness connector to enable the operation of the auxiliary headlight by the lighting system of the vehicle.

2. An independent lighting system as defined in claim 1, wherein either said second harness connector or said third harness connector, but not both said second harness connector and said third harness connector, may be connected to said first harness connector.

3. An independent lighting system as defined in claim 1, wherein said first harness connector may be connected to either of said second harness connector or said third harness connector, but said second harness connector may not be connected to said third harness connector.

4. An independent lighting system as defined in claim 3, wherein said first harness connector is of a first gender and said second harness connector and said third harness connector are of a second gender which is different from said first gender.

5. An independent lighting system as defined in claim 1, wherein said first harness connector, said second harness connector, and said third harness connector each have housings with integrated sealing elements such that whenever said first harness connector is connected to one of said second harness connector and said third harness connector a seal is formed therebetween.

6. An independent lighting system as defined in claim 1, wherein said first harness connector, said second harness connector, and said third harness connector have housings with an integral releasable locking latch such that said first harness connector will remain connected to the one of said second harness connector and said third harness connector it is connected to until said locking latch is released.

7. An independent lighting system as defined in claim 1, wherein the vehicle also has a turn signal light and the independent lighting system also has a turn signal light, and wherein said independent lighting system additionally comprises:
   a turn signal connector for connection to the turn signal light of the vehicle, said turn signal connector also being electrically connected to said first harness connector;
   wherein the turn signal light of the independent lighting system is electrically connected to said third harness connector, whereby when said first harness connector is connected to said third harness connector the turn signal light of the independent lighting system will operate whenever the turn signal light of the vehicle is operated.

8. An independent lighting system as defined in claim 1, wherein the vehicle also has a parking light and the independent lighting system also has a parking light, and wherein said independent lighting system additionally comprises:
   a parking light connector for connection to the parking light of the vehicle, said parking light connector also being electrically connected to said first harness connector;
   wherein the parking light of the independent lighting system is electrically connected to said third harness connector, whereby when said first harness connector is connected to said third harness connector the parking light of the independent lighting system will operate whenever the parking light of the vehicle is operated.

9. An independent lighting system as defined in claim 1, wherein the vehicle headlight and the auxiliary headlight each include a high beam light and a low beam light.

10. An independent lighting system as defined in claim 9, wherein both said headlight connector and said headlight power connector are three pin connectors.

11. An independent lighting system as defined in claim 1, wherein the vehicle has right and left vehicle headlights respectively having right and left headlight plugs connected thereto to provide power from the lighting system of the vehicle to the right and left vehicle headlights, and wherein the independent lighting system also has left and right auxiliary headlights, and wherein said headlight connector is connected to the right vehicle headlight in place of the right headlight plug, and wherein said headlight power connector is connected to the right headlight plug, and wherein said third harness connector is electrically connected to one of the right and left auxiliary headlights, said independent lighting system additionally comprising:
   a second headlight connector for connection to the left vehicle headlight in place of the left headlight plug;
   a second headlight power connector for connection to the left headlight plug, wherein said second harness connector is electrically connected to said second headlight connector and to said second headlight power connector; and
   a fourth harness connector which is electrically connected to the other of the right and left auxiliary headlights, wherein said fourth harness connector may be removably connected to said second harness connector to enable the operation of the other of the right and left auxiliary headlights by the lighting system of the vehicle.

12. An independent lighting system as defined in claim 11, wherein the right and left vehicle headlights and the right and left auxiliary headlights each include a high beam light and a low beam light and each have a high beam electrical lead, a low beam electrical lead, and a common electrical lead, and wherein the right and left headlight plugs each have a high beam electrical feed, a low beam electrical feed, and a common electrical feed, and wherein said headlight connector and said second headlight connector each have a high beam electrical feed, a low beam electrical feed, and a common electrical feed, and wherein said headlight power connector and said second headlight power connector each have a high beam electrical lead, a low beam electrical lead, and a common electrical lead.

13. An independent lighting system as defined in claim 12, wherein when said first and third harness connectors are connected together and when said second and fourth harness connectors are connected together, the high beam electrical lead, the low beam electrical lead, and the common electrical lead of each of the right and left vehicle headlights are respectively electrically disconnected from the high beam electrical feed, the low beam electrical feed, and the common electrical feed from each of the right and left headlight plugs.

14. An independent lighting system as defined in claim 12, wherein when said first and third harness connectors are connected together and when said second and fourth harness connectors are connected together, the high beam electrical lead and the low beam electrical lead of each of the right and left vehicle headlights are respectively electrically disconnected from the high beam electrical feed and the low beam electrical feed from each of the right and left headlight plugs, but the common electrical lead of each of the right and left vehicle headlights remain respectively electrically connected to the common electrical feed from each of the right and left headlight plugs.

15. An independent lighting system as defined in claim 12, wherein when said first and third harness connectors are connected together and when said second and fourth harness connectors are connected together, the common electrical lead of each of the right and left vehicle headlights is respectively electrically disconnected from the common electrical feed from each of the right and left headlight plugs, but the high beam electrical lead and the low beam electrical lead of each of the right and left vehicle headlights remain respectively electrically connected to the high beam electrical feed and the low beam electrical feed from each of the right and left headlight plugs.

16. An independent lighting system as defined in claim 15, additionally comprising:
a diode installed in series with the high beam electrical lead and the low beam electrical lead of each of the right and left vehicle headlights, said diodes preventing the illumination of said right and left vehicle headlights when said first and third harness connectors are connected together and when said second and fourth harness connectors are connected together.

17. An independent lighting system as defined in claim 1, wherein said second harness connector includes electrical jumper connections therein to enable the operation of the vehicle headlight by the lighting system of the vehicle when said second harness connector is connected to said first harness connector.

18. An independent lighting system for connecting first and second auxiliary headlights on a vehicle accessory to the lighting system of a vehicle, the vehicle having first and second vehicle headlights and first and second headlight plugs which respectively provide power from the lighting system of the vehicle to the first and second vehicle headlights, said independent lighting system comprising:
a first headlight connector for connection to the first vehicle headlight in place of the first headlight plug;
a second headlight connector for connection to the second vehicle headlight in place of the second headlight plug;
a first headlight power connector for connection to the first headlight plug;
a second headlight power connector for connection to the second headlight plug;
a first harness connector which is electrically connected to said first headlight connector and to said first headlight power connector;
a second harness connector which is electrically connected to said second headlight connector and to said second headlight power connector, wherein said second harness connector may be connected to said first harness connector to enable the operation of the first and second vehicle headlights by the lighting system of the vehicle;
a third harness connector which is electrically connected to the first auxiliary headlight, wherein said third harness connector may be connected to said first harness connector to enable the operation of the first auxiliary headlight by the lighting system of the vehicle; and
a fourth harness connector which is electrically connected to the second auxiliary headlight, wherein said fourth harness connector may be connected to said second harness connector to enable the operation of the second auxiliary headlight by the lighting system of the vehicle.

19. An independent lighting system for connecting an auxiliary headlight to the lighting system of a vehicle, the vehicle having a vehicle headlight and a headlight plug which provides power to the vehicle headlight, said independent lighting system comprising:
a headlight connector for connection to the vehicle headlight in place of the headlight plug;
a headlight power connector for connection to the headlight plug;
a first harness connector which is electrically connected to said headlight connector and to said headlight power connector;
a second harness connector for removable connection to said first harness connector to enable the operation of the vehicle headlight; and
a third harness connector which is electrically connected to the auxiliary headlight, said third harness connector for removable connection to said first harness connector to enable the operation of the auxiliary headlight.

20. A method of connecting an auxiliary headlight to the lighting system of a vehicle, the vehicle having a vehicle headlight and a headlight plug which supplies power from the lighting system of the vehicle to the vehicle headlight, said method comprising:
connecting a headlight connector to the vehicle headlight in place of the headlight plug, said headlight connector being electrically connected to a first harness connector;
connecting a headlight power connector to the headlight plug, said headlight power connector also being electrically connected to a first harness connector;
removably connecting a second harness connector to said first harness connector to enable the operation of the vehicle headlight by the lighting system of the vehicle; and
removably connecting a third harness connector which is electrically connected to the auxiliary headlight to said first harness connector to enable the operation of the first auxiliary headlight by the lighting system of the vehicle.

* * * * *